United States Patent
Vacura et al.

(10) Patent No.: US 11,800,044 B1
(45) Date of Patent: Oct. 24, 2023

(54) METHODS, SYSTEMS, AND DEVICES FOR ALTERING IMAGES CAPTURED BY AN ELECTRONIC DEVICE FOR OPTIMAL PRESENTATION ON A COMPANION DEVICE

(71) Applicant: Motorola Mobility LLC, Chicago, IL (US)

(72) Inventors: Daniel M Vacura, Chicago, IL (US); Bill Ryan, Libertyville, IL (US); Jeffrey S Vanhoof, Gurnee, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/709,858

(22) Filed: Mar. 31, 2022

(51) Int. Cl.
*H04N 5/262* (2006.01)

(52) U.S. Cl.
CPC ................................ *H04N 5/2628* (2013.01)

(58) Field of Classification Search
CPC ........ H04N 5/2628; H04N 7/14; H04N 7/141; H04N 2007/145; H04N 7/15; H04N 7/151; H04N 7/157
USPC .............................................. 348/14.02–14.9
See application file for complete search history.

(56) References Cited

U.S. PATENT DOCUMENTS

| | | | | |
|---|---|---|---|---|
| 2012/0050331 A1* | 3/2012 | Kanda | ............ | H04N 21/440263 345/649 |
| 2014/0358981 A1 | 12/2014 | Miyake | | |
| 2015/0193187 A1* | 7/2015 | Kimn | ..................... | G09G 5/006 345/1.2 |
| 2019/0333479 A1 | 10/2019 | Maalouf | | |
| 2020/0344278 A1* | 10/2020 | Mackell | .............. | H04L 65/1083 |
| 2022/0391158 A1* | 12/2022 | Lemmens | ............. | G06F 3/1454 |

OTHER PUBLICATIONS

Castiaux, Brent, "Non-Final Office Action", U.S. Appl. No. 17/709,878; filed Mar. 31, 2022; dated Dec. 20, 2022.
"How-To: Turn your Android phone into the best webcam for Zoom, Skype, Meet and Teams for free", Published Mar. 21, 2021 online at https://www.gsmarena.com/best_way_to_use_your_android_phone_as_a_webcam_we_test_the_apps_and_compare_the_results-news-47897.php.
Michaels, Philip, "Motorola 'Ready For' transforms this Android into a mini PC"; Tom's Guide; Published Mar. 19, 2021 online at https://www.tomsguide.com/news/motorola-ready-for-transforms-this-android-phone-into-a-mini-pc.
"Motorola—Ready For", Available prior to filing of present application; Viewed online at https://www.motorola.com/we/ready-for.

(Continued)

*Primary Examiner* — Maria El-Zoobi
(74) *Attorney, Agent, or Firm* — Philip H. Burrus, IV

(57) ABSTRACT

A method in an electronic device includes detecting the electronic device being electronically in communication with another electronic device while an image capture device of the electronic device captures one or more images from an environment of the electronic device. One or more processors determine one or more content input parameters requested by the content presentation companion device that differ from at least one content output parameter of the image capture device. The one or more processors alter the one or more images to create one or more altered images meeting the one or more content input parameters required for the presentation on the content presentation companion device.

20 Claims, 13 Drawing Sheets

(56) References Cited

OTHER PUBLICATIONS

Mello, Elaine M, "Using your Android phone as a web camera on the Mac Using USB", Published May 2020 online at https://open.mit.edu/c/teachremote/2gu/using-your-android-phone-as-a-web-camera-on-the.

Russell, Brandon, "Galaxy S21 features wireless support for Samsung Dex on PC", Published Feb. 5, 2021 online at https://www.xda-developers.com/galaxy-s21-wireless-support-samsung-dex-on-pc/.

Castiaux, Brent, "Notice of Allowance", U.S. Appl. No. 17/709,878; filed Mar. 31, 2022; dated May 5, 2023.

* cited by examiner

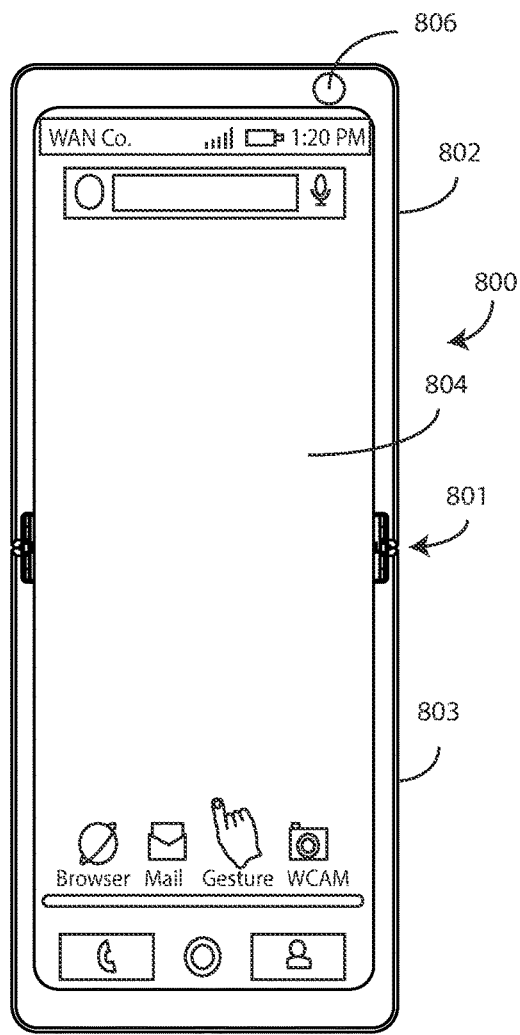
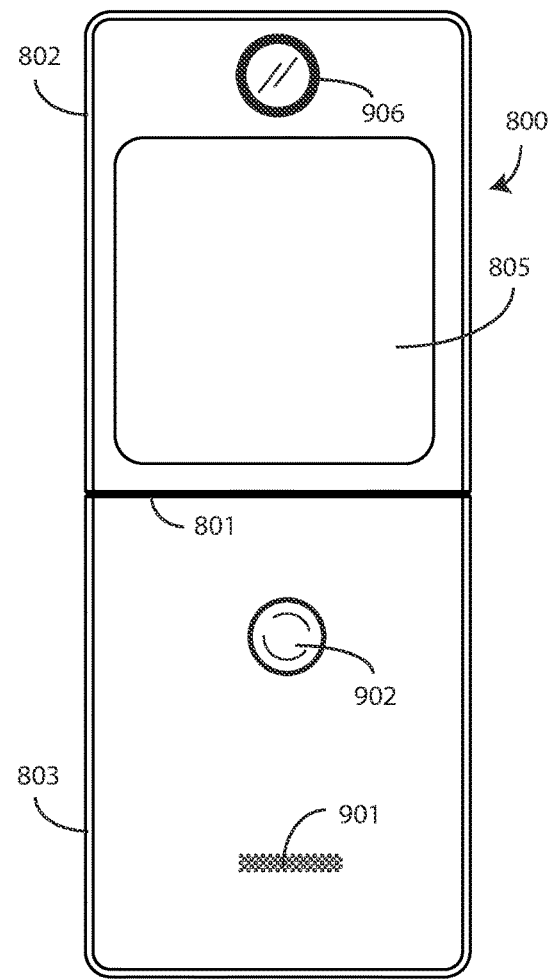
*FIG. 8*   *FIG. 9*

-- PRIOR ART --

METHODS, SYSTEMS, AND DEVICES FOR ALTERING IMAGES CAPTURED BY AN ELECTRONIC DEVICE FOR OPTIMAL PRESENTATION ON A COMPANION DEVICE

BACKGROUND

Technical Field

This disclosure relates generally to electronic devices, and more particularly to electronic devices having image capture devices and communication capabilities with companion electronic devices.

Background Art

Many modern electronic devices, including smartphones, tablet computers, and laptop computers, are equipped to engage in videoconferences or video "chats" across networks with other electronic devices. Users employ such devices to communicate with friends, family, and work colleagues. This is especially true during times of pandemic, when people communicate remotely rather than face to face. Illustrating by example, some studies suggest that while a majority of Americans routinely use videoconferences during the SARS-CoV-2 pandemic, over a third of those users had never used a videoconference platform prior to the pandemic occurring.

Despite some modern smartphones being equipped with sophisticated digital cameras offering fine image capture detail and excellent colors in low-light environments, many people engaged in videoconferences default to using a lower quality laptop image capture device or simple, off-the-shelf "webcam," either of which offers inferior performance when compared to the most recent smartphone devices. It would be advantageous to have improved methods, systems, and devices that provide more optimal videoconference or video chat performance.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 8 illustrates the front side of another explanatory electronic device in accordance with one or more embodiments of the disclosure.

FIG. 9 illustrates the rear side of the electronic device of FIG. 8.

Figure 1:
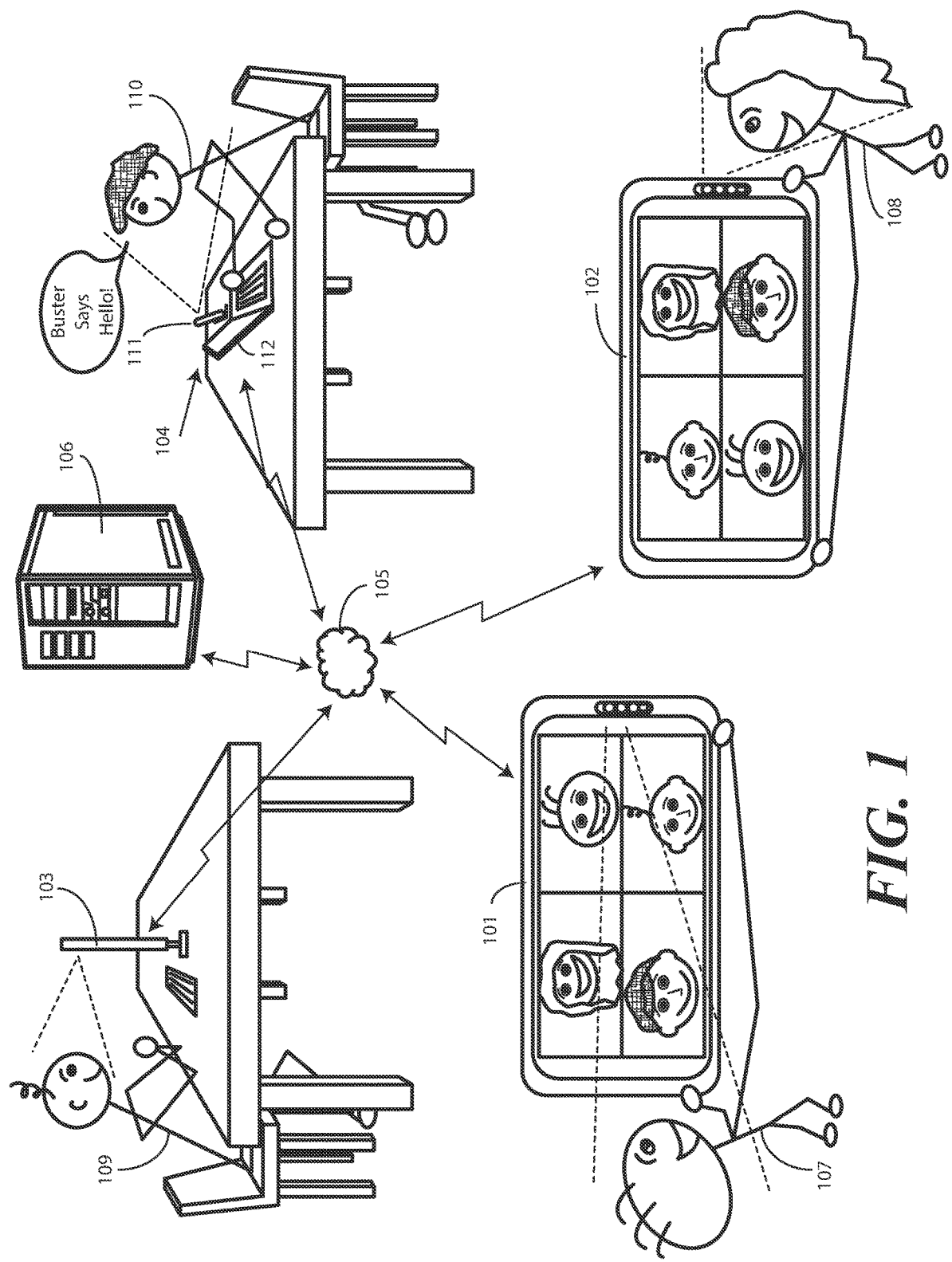
FIG. 1 illustrates one explanatory videoconference in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining, by one or more processors of an electronic device, one or more content input parameters requested by a companion device serving as a primary, secondary, or auxiliary display for the electronic device and, in response, altering one or more images captured by an image capture device of the electronic device to create one or more altered images to be delivered to the companion device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of detecting one or more or a geometric form factor of an electronic device and/or an orientation of the electronic device in three-dimensional space to identify one or more content output parameters of an image capture device and, thereafter, modifying one or more images captured by an image capture device to change the one or more content operation parameters prior to delivering the one or more images to a companion device for display thereon as described herein. The non-processor circuits may include, but are not limited to, a radio receiver, a radio transmitter, signal drivers, clock circuits, power source circuits, and user input devices.

As such, these functions may be interpreted as steps of a method to perform the capture of one or more images by an image capture device for presentation on a companion device, modification of the one or more images to change content output parameters from the image capture device that differ from any content input parameters to create one or more modified images for delivery to the companion device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, modern smartphones are equipped with some of the best digital cameras in the consumer market. Newer devices generally offer the use of the latest imaging sensor and lens component technology to capture images or video that reveal fine details with excellent colors, even in low light environments. Many smartphones are even equipped with multiple cameras that allow the collective system to focus on a single subject—even in extreme zoom configurations—without losing any details. These systems also allow a user to greatly expand the field of view to capture more of a scene.

In addition to these high-quality image capture devices, most smartphones are also equipped with advanced graphics processors, dedicated artificial intelligence (AI) engines, and additional hardware sensors capable of detecting orientation and movement. With all of this power, users of such devices increasingly rely upon the same for most of their photograph and video capture needs.

Despite all of this power, when engaged in videoconferences or video chats, many consumers rely on simplistic and basic "webcams" that attach to a computer using a Universal Serial Bus (USB) connection or other similar interface. Alternatively, they opt for a camera of a laptop, which is often inferior to those found on modern smartphones. The use of such cameras results in suboptimal videoconference image capture.

Embodiments of the disclosure provide a solution to this problem that encourages the use of a smartphone imager with a complementary auxiliary display for videoconferencing and video chatting. Embodiments of the disclosure accomplish this by equipping the smartphone with the capabilities to provide images captured by the image capture device of the smartphone in any format that the auxiliary display requests. If the auxiliary display is in a landscape mode, one or more processors of the smartphone provide images captured by the image capture device of the smartphone in landscape mode—regardless of whether the smartphone is oriented in a portrait or landscape orientation. Similarly, if the auxiliary display is pivoted to a portrait orientation, the auxiliary display can request portrait orientation images by delivering signals to a communication device of the electronic device. One or more processors of the electronic device then deliver portrait orientation images to the auxiliary display. Again, this happens regardless of whether the smartphone is oriented in the portrait or landscape orientation.

In one or more embodiments, one or more processors of an electronic device detect a communication device electronically in communication with an auxiliary display, referred to herein as a "content presentation companion device." In one or more embodiments the content presentation companion device is operating as a primary, secondary, or auxiliary display for the electronic device while an image capture device of the electronic device captures one or more images from an environment of the electronic device.

In one or more embodiments, the one or more processors determine from signals received from the content presentation companion device by the communication device, one or more content input parameters requested by the content presentation companion device. Examples of such content input parameters that the content presentation companion device may request include a particular aspect ratio, a particular orientation, e.g., portrait or landscape, a particular frame rate, and so forth. In one or more embodiments, these content input parameters differ from at least one content output parameter of the image capture device.

Where they do, the one or more processors alter the one or more images to create one or more altered images meeting the one or more content input parameters required for the presentation on the content presentation companion device. Thereafter, the one or more processors cause the communication device to transmit the altered images to the content presentation companion device for presentation thereon.

In one or more embodiments, one or more sensors of the electronic device initially determine whether the electronic device is in a docked or substantially stationary position. Embodiments of the disclosure contemplate that the modification of the images being captured by the image capture device to meet the one or more content input parameters may only be desirable for instances where the electronic device is being used as an image capture device for a videoconference. Embodiments of the disclosure contemplate that when this is occurring, the electronic device will typically be docked or stationary. Accordingly, in one or more embodiments the altering of the one or more images to create the one or more altered images meeting the one or more content input parameters required for the presentation at the content presentation companion device occurs only when the electronic device is substantially stationary or docked.

In one or more embodiments, one or more processors of the electronic device then determine that the electronic device is in communication with a content presentation companion device that is acting as a primary display for the electronic device. Optionally, using gravity sensors, orientation detectors, or other sensors, the one or more processors determine a geometric orientation of the electronic device in three-dimensional space and/or a geometric form factor of the electronic device to determine the one or more content output parameters associated with the images being captured by the image capture device. If, for example, the orientation of the electronic device is a landscape orientation while the one or more content input parameters requested the one or more images in a portrait image orientation, the one or more processors would need to alter the one or more images to create images in a portrait image orientation prior to delivering the same to the electronic device.

The one or more processors can also optionally determine whether the aspect ratio requested by the one or more content input parameters is the same as that defined by the one or more content output parameters of the image capture device. If, for example, the one or more content output parameters define a 16:9 aspect ratio while the one or more content input parameters requested the one or more images in a 4:3 aspect ratio, the one or more processors would need to alter the one or more images to change the aspect ratio prior to delivery to the electronic device.

In one or more embodiments, in response to a determination that the electronic device is, for example, docked in a portrait orientation, the one or more processors may cause the communication device to provide a video feed from the image capture device to the content presentation companion device in a landscape mode by determining a field of view (FOV) that accommodates the one or more content input parameters required by the electronic device. This determination of the field of view may require the application of a cropping filter to the one or more images captured by the image capture device so that the resulting image size matches the requests of the one or more content input parameters. In one or more embodiments, the position of the cropping filter is a function of a region of interest (ROI) identified by the one or more processors and/or generated artificial intelligence driven subject tracking.

In one or more embodiments, the region of interest is determined using artificial intelligence based subject tracking that includes the following steps: first, an aspect ratio of the image capture device of the electronic device when mounted in a portrait orientation is determined. This aspect ratio might be 9:16 or 3:4, for example.

Next, the artificial intelligence based subject tracking utilizes a subject tracking procedure to identify depictions of a subject in the one or more images being captured by the image capture device of the electronic device to determine centralized locations within the cropping mask. In one or more embodiments, artificial intelligence based subject tracking system determines a region of interest within the one or more images, with the crop mask positioned such that region of interest is situated within the one or more cropped images. In one or more embodiments, the region of interest depicts a subject of the one or more cropped images.

Next, the one or more processors determine the aspect ratio of the content presentation companion device requested by the one or more content input parameters. If, for example, the content presentation companion device is oriented in a landscape mode, this might be 16:9 or 4:3. The one or more processors then apply the cropping mask to the one or more images being captured by the image capture device of the electronic device in accordance with the aspect ratio requested by the content presentation companion device. Thus, despite the one or more images being captured with an aspect ratio of 9:16 or 3:4, in one or more embodiments the application of the cropping mask alters the one or more images to create one or more altered images having a different aspect ratio, e.g., 16:9 or 4:3.

The artificial intelligence based subject tracking system can track the subject based upon a number of factors. In one or more embodiments, these factors include the distance between the image capture device and the subject. The artificial intelligence based subject tracking system can determine if the subject is one of human, animal or a non-living being. If the artificial intelligence based subject tracking system determines that the subject is a human, it may utilize facial geometry of the subject as one of round versus elongated to determine whether the subject is oriented in a portrait image orientation or a landscape image orientation. If the subject is an animal, the artificial intelligence based subject tracking may use the body structure of the animal, be it a dog, cat, or bird, in the same manner.

Advantageously, embodiments of the disclosure allow perfect images to be delivered to a content presentation companion device in accordance with one or more content input parameters requested by that content presentation companion device regardless of orientation or geometric shape of the electronic device delivering those images. Embodiments of the disclosure advantageously allow electronic devices having a variety of different geometric form factors and/or positions in three-dimensional space to provide perfectly compensated images to a content presentation companion device when the electronic device is being used as a webcam or other type of camera.

In one or more embodiments, an electronic device provides a video feed captured by its image capture device, when captured in a portrait image orientation, in a landscape image orientation by determining a field of view based upon a region of interest generated by artificial intelligence driven subject tracking. In one or more embodiments, this occurs in response to a determination that the electronic device is docked and in the portrait orientation while in communication with a content presentation companion device being used as a display. In effect, embodiments of the disclosure determine what the orientation is of the electronic device in relation to the image sensor capturing the one or more images (note that the electronic device may include multiple sensors) and reorients the same to match the one or more content input parameters requested by a content presentation companion device.

It should be noted that embodiments of the disclosure are not limited to usage with only a content presentation companion device. In fact, in one or more embodiments the one or more processors of the electronic device do not care what the companion device is. It could be, for example, a digital video recorder having no display whatsoever. It could alternatively be an external memory device or cloud-based computing device. In one or more embodiments, all that is required is that the companion device deliver one or more content input parameters that differ from at least one content output parameter associated with an image capture device so that the one or more processors can then modify the one or more images to match the one or more content input parameters requested by the companion device.

Accordingly, in one or more embodiments one or more processors detect a communication device of the electronic device electronically in communication with another electronic device while an image capture device of the electronic device captures one or more images from an environment of the electronic device. The other electronic device could be anything—a digital video recorder, an external memory, an Internet of Things device, or another device. The one or more processors determine, from signals received from the other electronic device, one or more content input parameters requested by the electronic device that differ from at least one content output parameter of the image capture device. When they are received, the one or more processors alter the one or more images to create one or more altered images meeting the one or more content input parameters. Thus, while a content presentation companion device will be used below for ease of discussion, it should be noted that the content presentation companion device could be any companion device regardless of whether it includes a display and regardless of for what reason the companion device needs the one or more images. All that the communication device be required to do is transmit one or more content input parameters to the electronic device with the image capture device so that its one or more processors can modify the one or more images as necessary before delivering the same to the companion device.

In one or more embodiments, a method in an electronic device comprises detecting, with one or more sensors, whether the electronic device is in a stationary condition or a docket condition. The method then includes detecting, with a communication device, a content presentation companion device—or any other companion device—in communication with the communication device.

In one or more embodiments, the companion device is a content presentation companion device being used as a primary display for the electronic device. In one or more embodiments, the content presentation companion device has associated therewith content input parameters. In one or more embodiments, the one or more content input parameters are required for presentation of content on the content presentation companion device.

In one or more embodiments, the method includes capturing, with an image capture device, one or more images for presentation on the content presentation companion device. In one or more embodiments, the one or more images having associated therewith content output parameters defined by a physical state of the image capture device. The physical state can include how the sensor of the image capture device is positioned within the electronic device, how the electronic device is oriented in three-dimensional space, a geometric form factor of the electronic device, and so forth.

In one or more embodiments, the method comprises modifying, with one or more processors, the one or more images to change any of the content output parameters that differ from any of the content input parameters to create one or more modified images. Thereafter, the method includes delivering, with the communication device, the one or more modified images to the content presentation companion device for presentation on the content presentation companion device.

Turning now to FIG. 1, illustrated therein is one explanatory system in accordance with one or more embodiments of the disclosure. As shown, multiple participants 107,108,109, 110 each employ their own respective electronic device 101,102,103 to engage with the other participants via the videoconference. In this illustrative embodiment, electronic devices 101,102 are shown as smartphones, while electronic device 103 is shown as desktop computers. However, electronic devices suitable for use in the videoconference system can take other forms as well. For instance, tablet computers, notebook computers, audiovisual devices, mobile phones, smart watches, or other devices can be used by participants to engage in the videoconference as well. Other examples of electronic devices will be obvious to those of ordinary skill in the art having the benefit of this disclosure.

Participant 110 is using a hybrid system 104 where his tablet computer 111 is serving as a "webcam" for his laptop computer 112, which is serving as a primary display device. Said differently, the tablet computer 111 is acting as the image capture device for the hybrid system 104, while the laptop computer 112 operates as a content presentation companion device serving as a primary display for the tablet computer 111. By doing this, participant 110 leverages the incredibly high quality of the image capture device built into his tablet computer 111 while viewing images captured by this image capture device, as well as image content received from the other electronic devices 101,102,103 across the network 105, on the larger display of the laptop computer 112.

As shown in FIG. 1, each electronic device 101,102,103, as well as the hybrid system 104, is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each electronic device 101,102,103 and the hybrid system 104 is also in communication with a video conferencing system server complex 106 across the network 105. In one or more embodiments video conferencing system server complex 106 includes components such as a web server, a database server, an audio server, and optionally a video server (the video server may be omitted for audio only conferencing systems) that are operable to facilitate videoconferences between the various electronic devices 101,102,103 and/or hybrid system 104 of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's electronic device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various electronic devices 101,102, 103 and the hybrid system 104. For example, as can be seen on the displays of electronic devices 101,102, in this example each participant 107,108,109,110 can see each other participant engaged in the videoconference.

In the illustrative example of FIG. 1, the participants 107,108,109,110 are engaged in the videoconference. Since the participants 107,108,109,110 are all engaged in a videoconference, each can see conference content in the form of a combined video feed from each other participant 107,108,109,110 presented on the display of each electronic device 101,102,103 and the hybrid system 104, as well as a video feed of themselves. Under ordinary conditions, each participant 107,108,109,110 can hear an audio feed from each other participant 107,108,109,110 as well.

In this illustrative embodiment, participant 110 is acting as a presenter, and is speaking, noting that a friend, Buster, "says hello." The presenter's tablet computer 111 captures images of the presenter while speaking in the form of video and may optionally capture the audio as well. Either the tablet computer 111 or the laptop computer 112 can optionally transmit this video and audio of the presenter to the other electronic devices 101,102,103 via the video conferencing system server complex 106. While participant 110 is the presenter at the moment, it is to be understood that the presenter role can be changed throughout the videoconference as well, with each other participant 107,108,109 taking the role of presenter at other times as situations warrant.

Figure 2:
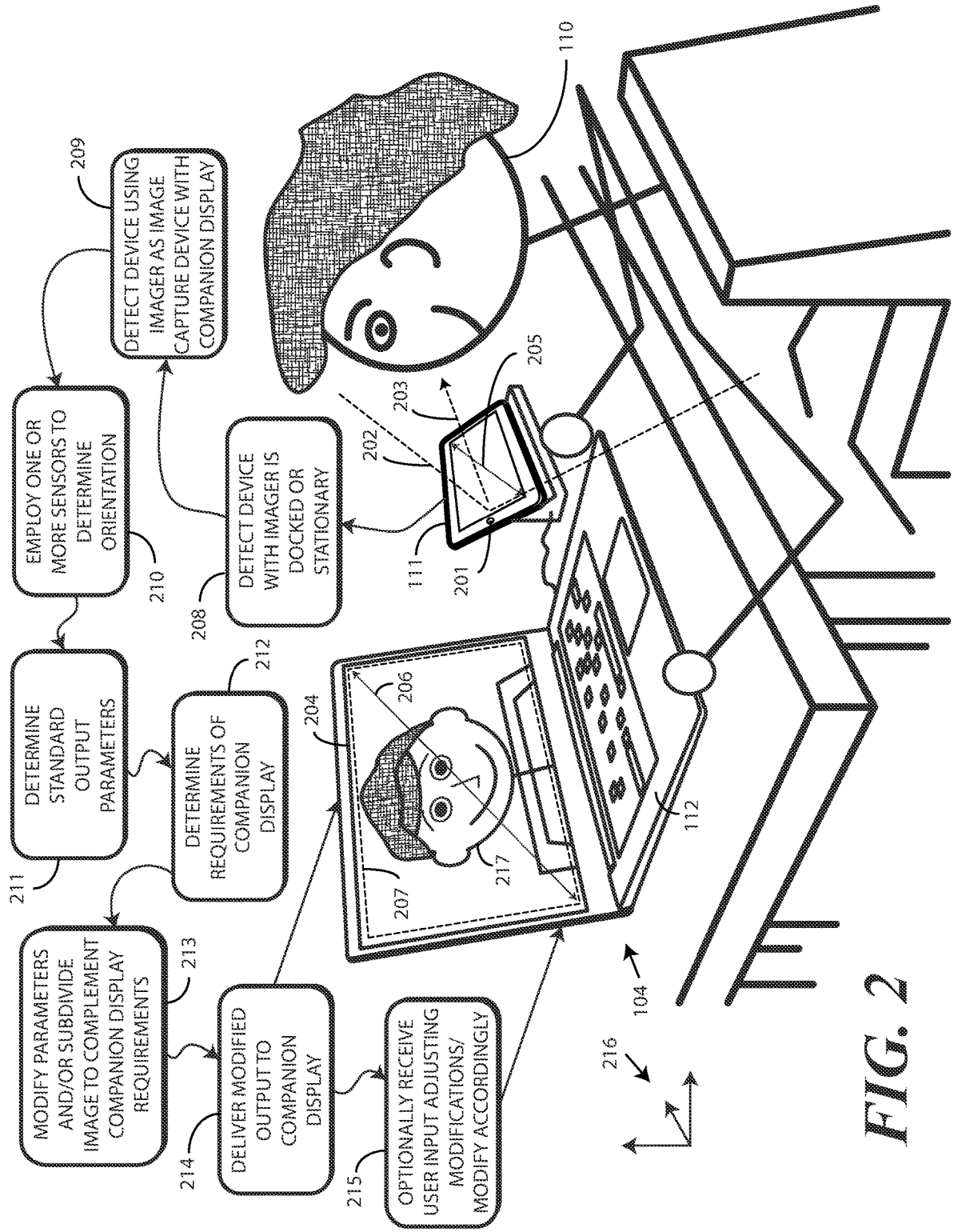
FIG. 2 illustrates one explanatory method in accordance with one or more embodiments of the disclosure.

This hybrid system 104 of FIG. 1 is illustrated in more detail along with an explanatory method in accordance with one or more embodiments of the disclosure in FIG. 2 Turning now to FIG. 2, the tablet computer 111 and laptop computer 112 of the hybrid system 104 can more readily be seen.

As shown, the tablet computer 111 is in a docked configuration in that it has been coupled to a docking station 111 that is electrically coupled to the laptop computer 112. In this illustrative embodiment, the docking station 111 includes one or more electrical contacts that couple to complementary electrical contacts in the tablet computer 111 so that signals from the tablet computer 111, including signals transmitting one or more images 203 captured by an image capture device 201 of the tablet computer 111, can be transmitted to the laptop computer 112 through an electrical connection coupling the docking station 111 to the laptop computer 112, one example of which is a wire. In other embodiments, rather than including electrical contacts, the docking station 111 will include a wireless communication circuit configured to communicate wirelessly with the tablet computer 111. Similarly, the wireless communication circuit of the docking station 111 can be configured to communicate with the laptop computer 112 wirelessly as well. In still other embodiments, the docking station 111 will be a mechanical docking station only, supporting the tablet computer 111 in an orientation in three-dimensional space where the image capture device has its field of view 202 directed toward the participant 110 using the hybrid system 104, with a communication device of the tablet computer 111 communicating wirelessly with the laptop computer 112 directly. Other examples of docking stations and docking station configurations will be obvious to those of ordinary skill in the art having the benefit of this disclosure.

In the illustrative example of FIG. 2, the image capture device 201 of the tablet computer 111 sits in the docking station 111 with its field of view 202 directed toward participant 110. The image capture device 201 is capturing one or more images 203 of participant 110, which are being delivered to the laptop computer 112 for presentation on the display 204 of the laptop computer 112.

In this illustrative embodiment, the image capture device 201 of the tablet computer 111 and the display 204 of the laptop computer 112 have associated therewith different parameters. While both are shown positioned in a landscape orientation, in this illustrative embodiment the aspect ratio 205 of the tablet computer 111 is 4:3 in the landscape orientation, while the aspect ratio 206 of the display 204 of the laptop computer 112 is 16:9. Additionally, the field of view 202 of the image capture device 201 of the tablet computer 111 happens to be set to an ultra-wide setting, so the amount of content captured by the image capture device 201 of the tablet computer 111, if presented as captured on the display 204 of the laptop computer 112, would ordinarily be suboptimal for videoconferencing purposes. First, the aspect ratio difference would mean that there would either be black boxes bounding sides of the one or more images 203 if presented at the 4:3 aspect ratio or would be stretched or overflow the screen. Second, if the entire image content with the ultra-wide field of view 202 were presented, participant 110 would look incredibly small due to the large amount of information captured in each of the one or more images 203.

Advantageously, the tablet computer 111 is configured in accordance with embodiments of the disclosure so that all of this is avoided. As such, the one or more modified images 217 presented on the display 204 of the laptop fit the 16:9 aspect ratio perfectly and include only a region of interest 207 where the subject, i.e., participant 110, is situated substantially in the center of this region of interest 207. Thus, the tablet computer 111 provides one or more images 203 to the laptop computer 112 for presentation on the display 204 of the laptop computer 112 that are perfectly configured for videoconferencing presentations.

To do this, one or more processors of the tablet computer 111 execute a method 200 in accordance with one or more embodiments of the disclosure. Beginning at step 208, one or more sensors of the tablet computer 111 detect whether the tablet computer 111 is in a stationary or docked condition. As noted above, embodiments of the disclosure contemplate that when the tablet computer 111 is being used as a webcam for another electronic device, here the laptop computer 112, it will frequently be the case that the tablet computer 111 is still—either by sitting on a desk or by being placed in a docking station 111. Moreover, modification of the one or more images 203 being captured by the image capture device 201 of the tablet computer 111 to meet the one or more content input parameters required by the laptop computer 112 may only be desirable for instances where the tablet computer 111 is being used as an image capture device for the other electronic device. Accordingly, in one or more embodiments step 208 first determines, with one or more sensors of the tablet computer 111, whether the tablet computer 111 is in a docked or stationary condition.

At step 209, one or more processors of the tablet computer 111 determine that a communication device of the tablet computer 111 is in communication with the laptop computer 112 while (1) the laptop computer 112 is being used as a primary display for the tablet computer 111 and (2) while the one or more images 203 are being captured by the image capture device 201 of the tablet computer 111.

At step 210, the one or more processors of the tablet computer 111 detect one or both of a geometric form factor of the tablet computer 111 and/or an orientation of the tablet computer 111 in three-dimensional space 216. In the illustrative example of FIG. 2, the tablet computer 111 has a single device housing that does not bend and does not include hinges. Accordingly, the geometric form factor of the tablet computer 111 is fixed. However, in other embodiments described below with reference to FIGS. 8-12, a smartphone, tablet computer, or other device can be configured in other ways as well. These include a configuration with a first device housing that is pivotable about a hinge relative to a second device housing between a closed position and an axially displaced open position. Embodiments of the disclosure contemplate that the different geometric form factors can change the orientation of the image sensor of the image capture device 201. The method 200 of FIG. 2 therefore optionally determines the geometric form factor of the tablet computer 111 as well as the orientation of the smartphone in the three-dimensional space 216, which is a landscape orientation as noted above.

At step 211, the one or more processors of the tablet computer 111 determine one or more content output parameters associated with the image capture device 201 of the tablet computer 111. These content output parameters define how, absent any manipulation by the one or more processors of the tablet computer 111, the one or more images 203 are rendered by the sensor of the image capture device 201. Knowledge of these content output parameters can be advantageous in that the one or more processors of the tablet computer 111 can modify them to match one or more content input parameters requested by the laptop computer 112 for rendering on its display 204 when the one or more content output parameters of the image sensor of the image capture device 201 and the one or more content output parameters of the display 204 of the laptop computer 112 differ.

Figure 3:
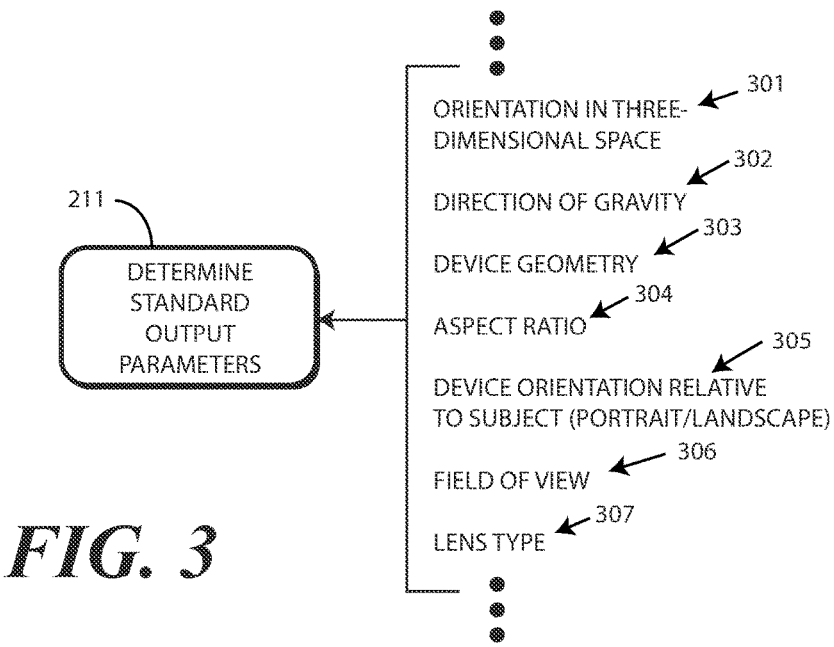
FIG. 3 illustrates one or more method steps in accordance with one or more embodiments of the disclosure.

Examples of these one or more content output parameters are shown in FIG. 3. Turning briefly to FIG. 3, in one or more embodiments the one or more content output parameters detected at step 211 can be determined by detecting an orientation 301 of the image capture device (201) in three-dimensional space (216). Since the sensor of the image capture device (201) is fixed within the housing of the tablet computer (111), this can be done by proxy by detecting the orientation 301 of the tablet computer (111) in the three-dimensional space (216).

If, for example, the tablet computer (111) is in a landscape orientation and the image sensor of the image capture device (201) is the same as that of the tablet computer (111), the one or more images (203) captured by the image capture device (201) will be in a landscape image orientation. By contrast, when the tablet computer (111) is rotated from the landscape orientation shown in FIG. 2 to a portrait orientation, the one or more images (203) captured in the image capture device (201) of the tablet computer (111) will be in the portrait image orientation. Thus, image orientation is one example of a content output parameter that is determined by the orientation 301 of the image sensor of the image capture device (201) in three-dimensional space (216), which may be the same or different from the orientation of the tablet computer (111) in three-dimensional space (216), but which will be fixed relative to the housing of the tablet computer (111) and can thus be detected via the orientation of the latter.

Detection of a direction of gravity 302 can also be detected at step 211 to determine the one or more content output parameters of the image capture device (201). If, for example the direction of gravity 302 runs along a major axis spanning a length of the tablet computer (111) (or image sensor), the one or more images (203) captured by the image capture device (201) will be in the portrait image orientation. By contrast, if the direction of gravity 302 runs along a minor axis spanning a width of the tablet computer (111) (or image sensor), the one or more images (203) captured by the image capture device (201) of the tablet computer (111) will be in the landscape image orientation. Thus, the one or more content output parameters determined at step 211 can also be determined using the direction of gravity 302.

As noted above, another example of a content output parameter defined by the physical structure of the image sensor of the image capture device (201) is the aspect ratio 304, examples of which include a 4:3 aspect ratio and a 16:9 aspect ratio. The dimensions of the image sensor of the image capture device (201) and the placement of sensor pixels thereon will determine the aspect ratio 304, which will remain fixed for the image sensor.

Embodiments of the disclosure contemplate that most content suitable for presentation on screens of electronic devices are formatted for one of two predefined aspect ratios: 4:3 and 16:9. While there are other aspect ratios in use, these two aspect ratios tend to be standards about which content providers configure content. The 4:3 aspect ratio is a legacy aspect ratio that dates itself to early cathode ray tubes associated with television sets. By contrast, the 16:9 ratio is sometimes referred to as a "widescreen" aspect ratio. Embodiments of the disclosure also contemplate that the 4:3 aspect ratio is well suited for use with tablet computers, as a tablet computer having a 4:3 aspect ratio has dimensions resembling a notepad or sheet of paper. By contrast, smartphones, gaming devices, and other handheld devices are well suited for the 16:9 aspect ratio, as this aspect ratio lends itself to an electronic device having dimensions that readily fit within a user's hand. Accordingly, since the device carrying the image capture device (201) of FIG. 2 was a tablet computer (111), its illustrative aspect ratio 304 is 3:4.

Another content output parameter can be the geometric form factor 303 of the electronic device. As will be described below with reference to FIGS. 8-12, rather than being rigid an electronic device can be configured to be deformable in one or more embodiments. Where, for example, an electronic device includes a first device housing that is pivotable about a hinge relative to a second device housing between an axially displaced open position and a closed position, pivoting the first device housing relative to the second device housing from the axially displaced open position to the closed position may invert an image capture device. Since people generally do not prefer to see a person upside down during a videoconference, in one or more embodiments the one or more content output parameters detected at step 211 include the geometric form factor 303 of the electronic device.

Another content output parameter can be the relationship 305 between the subject depicted in the one or more images (203) being captured by the image capture device (201) of the tablet computer (111) and the image orientation of the one or more images (203). Illustrating by example, when the image orientation is a landscape image orientation, ordinarily an axis of a person's head passing between their eyes would be oriented along the minor axis of the landscape image orientation. However, if the subject is lying down while the tablet computer (111) is capturing the one or more images (203) in the landscape image orientation, the same axis of the person's head would be oriented along the major axis of the landscape image orientation. Since people generally do not prefer to see a person sideways during a videoconference, in one or more embodiments the one or more content output parameters detected at step 211 include the relationship 305 between the subject depicted in the one or more images (203) being captured by the image capture device (201) of the tablet computer (111) and the image orientation of the one or more images (203).

Another content output parameter detected at step 211 can include the field of view 306 of the image capture device (201) capturing the one or more images (203). In the illustrative example of FIG. 2, the image capture device (201) was set to the ultra-wide field of view (202). However, embodiments of the disclosure contemplate that the field of view 306 can be set to many different settings, including ultra-zoom, zoom, portrait, square, wide, ultra-wide, and other settings in between. Since videoconference participants generally like to see the depictions of other participants generally fill their respective panel, in one or more embodiments step 211 detects a field of view 306 of the image capture device (201) as one of the one or more content output parameters. Where this field of view 306 is too wide, thereby making the subject look small, one or more cropping masks can be applied so that the subject generally fills a window, pane, or display depicting their personage in a videoconference.

Another content output parameter that can be detected at step 211 includes the type of lens 307 being used by the image capture device (201). Embodiments of the disclosure contemplate that a single image sensor may be capable of receiving light from multiple lenses. Thus, in one or more embodiments step 211 detects a type of lens 307 of the image capture device (201) as one of the one or more content output parameters.

It should be noted that the various output content parameters associated with an image capture device (201) shown in FIG. 3 as potentially being detected at step 211 are illustrative only. Numerous others will be obvious to those of ordinary skill in the art having the benefit of this disclosure. Moreover, these various output content parameters can be determined in any combination at step 211 as well.

Turning now back to FIG. 2, at step 212 one or more processors of the tablet computer 111 determine one or more content input parameters requested by the laptop computer 112. In the illustrative example of FIG. 2, the laptop computer 112 is functioning as a content presentation companion device serving as a primary display for the tablet computer 111. Accordingly, the one or more content input parameters required by the laptop computer 112 will be defined by the requirements used to present the one or more images 203 captured by the image capture device 201 of the tablet computer 111 on the display 204 of the laptop computer 112.

Thus, while a content output parameter of the image capture device 201 is having an aspect ratio 205 of 4:3 when in the landscape orientation, a content input parameter required by the laptop computer 112 for proper presentation of the one or more images 203 captured by the image capture device 201 of the tablet computer 111 on the display 204 of the laptop computer 112 is an aspect ratio 206 of 16:9, and so forth.

In one or more embodiments, step 212 comprises receiving signals from the laptop computer 112 using a communication device of the tablet computer 111. In one or more embodiments, when the tablet computer 111 establishes a paired connection with the laptop computer 112, one or more processors of the tablet computer 111 cause a communication device to broadcast a list to output parameter types available for selection. Processors of the laptop computer 112 then select the one or more content input parameters from the list and make a request by delivering electronic signals identifying the selected content input parameters to the communication device of the tablet computer 111.

Thus, in one or more embodiments step 212 comprises determining, by the one or more processors of the tablet computer 111 from signals received from the laptop computer 112 by the communication device of the tablet computer 111, one or more content input parameters requested by the laptop computer 112. In this example, at least one content input parameter, aspect ratio, differs from at least one content output parameter of the image capture device 201.

At step 213, one or more processors of the tablet computer 111 modify the one or more images 203 to change any of the content output parameters that differ from any of the content input parameters to create one or more modified images 217. This modification can occur in a variety of ways.

Figure 4:
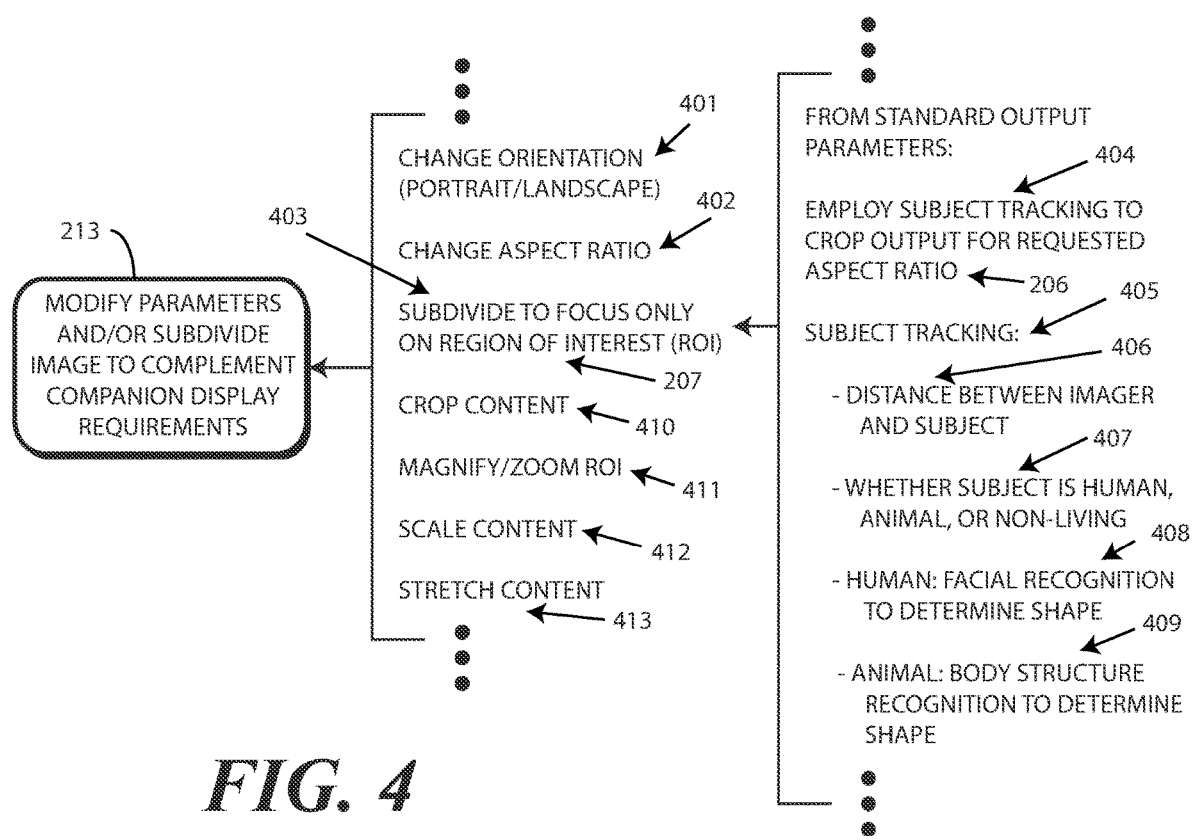
FIG. 4 illustrates one or more other method steps in accordance with one or more embodiments of the disclosure.

Turning briefly to FIG. 4, illustrates there are several explanatory ways by which the modifications of step 213 can be made. These techniques for modifying images are illustrative only and can be performed in combination. Additionally, other techniques for modifying images at step 213 will be obvious to those of ordinary skill in the art having the benefit of this disclosure.

In one or more embodiments, the one or more processors of the tablet computer (111) modify the one or more images (203) to change any of the content output parameters that differ from any of the content input parameters to create one or more modified images (217) at step 213 by changing an image orientation 401 of the one or more images (203). Had the tablet computer (111) of FIG. 2 been oriented in the portrait orientation, for example, step 213 would include transitioning the image orientation of the one or more images (203) from the portrait image orientation to the landscape image orientation. Similarly, had the laptop computer (112) been oriented in the portrait orientation, step (213) would include transitioning the image orientation of the one or more images (203) from the landscape image orientation to the portrait image orientation, and so forth.

Another way the one or more processors of the tablet computer (111) can modify the one or more images (203) to change any of the content output parameters that differ from any of the content input parameters to create one or more modified images (217) at step 213 is by changing the aspect ratio 402. In the illustrative embodiment of FIG. 2 above, step 213 would include at least transitioning the aspect ratio of the one or more images (203) from the first aspect ratio (205) of 4:3 to the second aspect ratio (206) of 16:9 aspect ratio to create the one or more modified images (217).

Still another way the one or more processors of the tablet computer (111) can modify the one or more images (203) to change any of the content output parameters that differ from any of the content input parameters to create one or more modified images (217) at step 213 is by selecting a subset 403 of the one or more images (203) containing a region of interest 207. Using the example from FIG. 2 above, since the field of view (202) of the image capture device (201) of the tablet computer (111) happens to be set to an ultra-wide setting, with the amount of content captured by the image capture device (201) of the tablet computer (111) being wide enough to make participant (110) look small on the display (204) of the laptop computer (112) without modification, in one or more embodiments step 213 comprises identifying a region of interest 207 within the one or more images (203) captured by the image capture device (201) of the tablet computer (111) and selecting a subset 403 of the one or more images (203) containing the region of interest 207 for presentation on the display of the content presentation companion device.

The way the selection of the region of interest 207 is made, like the modifications made at step 213, can vary. In one or more embodiments, the region of interest 207 is determined using artificial intelligence based subject tracking 404 that includes the one or more steps. In one or more embodiments, an aspect ratio (205) of the image capture device (201) of the electronic device capturing the one or more images (203) when mounted in a portrait orientation is determined. This aspect ratio might be 9:16 or 3:4, for example. In the illustrative embodiment of FIG. 2, the aspect ratio (205) when mounted in a portrait orientation is 3:4.

Next, the artificial intelligence based subject tracking 404 utilizes a subject tracking procedure 405 to identify depictions of a subject in the one or more images (203) being captured by the image capture device (201) of the electronic device to determine centralized locations within the region of interest 207. As noted above, in one or more embodiments the artificial intelligence based subject tracking 404 determines the region of interest 207 within the one or more images, selecting a subset 403 of the one or more images (203) such that the region of interest 207 is centrally situated within the subset 403.

Next, the artificial intelligence based subject tracking 404 determines the aspect ratio 206 of the laptop computer (112) identified in the one or more content input parameters. If, for example, the content presentation companion device is oriented in a landscape mode, this might be 16:9 or 4:3. The artificial intelligence based subject tracking 404 then selects the subset 403 of the one or more images (203) with that subset 403 matching the aspect ratio 206 requested by the content presentation companion device. Thus, despite the one or more images (203) being captured with an aspect ratio of 9:16 or 3:4, in one or more embodiments the artificial intelligence based subject tracking 404 alters the one or more images (203) to create one or more altered images (217) having a different aspect ratio, e.g., 16:9 or 4:3.

The artificial intelligence based subject tracking 404 can then track the subject based upon several factors. Accordingly, when the subject moves within the one or more images (203), the selected subset 403 of the one or more images (203) can change as well. Said differently, the subset 403 selected will change as the region of interest 207 changes within the one or more images (203).

In one or more embodiments, these factors include the distance 406 between the image capture device and the subject. The artificial intelligence based subject tracking 404 can determine 407 if the subject is one of human, animal or a non-living being. If the artificial intelligence based subject tracking 404 determines that the subject is a human, it may utilize facial geometry 408 of the subject as one of round vs elongated to determine whether the subject is oriented in a portrait image orientation or a landscape image orientation. If the subject is an animal, the artificial intelligence based subject tracking may use the body structure 409 of the animal, be it a dog, cat, or bird, in the same manner.

Once the region of interest 207 is determined, a crop mask 410 can be applied to the one or more images (203) around the region of interest 207 at step 213. Said differently, step 213 can comprise cropping the one or more images with a crop mask 410 matching the region of interest 207, the content presentation orientation of the content presentation companion device, or a videoconference presentation window to create one or more cropped images. In one or more embodiments, the crop mask 410 is positioned such that the region of interest 207 is positioned within the cropped images resulting from the application of the crop mask 410. In the example shown in FIG. 2 above, this resulted in participant (110) being generally centered, and filling, a videoconference presentation window. Said differently, in the example above the region of interest 207 depicted a subject of the one or more cropped images.

Yet other ways the one or more processors of the tablet computer (111) can modify the one or more images (203) to change any of the content output parameters that differ from any of the content input parameters to create one or more modified images (217) at step 213 is by magnifying 411, scaling 412, and/or stretching 413 the one or more images (203). In the illustrative embodiment of FIG. 2 above the field of view (202) of the image capture device (201) of the tablet computer (111) was set to an ultra-wide setting, with the amount of content captured by the image capture device (201) of the tablet computer (111) being wide enough to make participant (110) look small on the display (204) of the laptop computer (112) without modification. One or more of magnifying 411, scaling 412, and/or stretching 413 the one or more images (203) can be used to modify the images such that the subject generally matches and fills the content presentation orientation of the content presentation companion device or a videoconference presentation.

It should be noted that magnifying 411, scaling 412, and/or stretching 413 are different from changing the aspect ratio 402. As anyone who has ever owned a "wide screen" television with a 16:9 aspect ratio understands, scaling 412 does not result in a change of the aspect ratio 402. Generally speaking, when viewing content created at a 4:3 aspect ratio on a content presentation device having a 16:9 ratio, that content appears with black bars at the left and right sides of the image. Said differently, when the height of the 4:3 content is scaled 412 to match the height of the 16:9 content, black bars appear to the left and right of the image.

To combat such phenomena, in one or more embodiments step 213 can include both scaling 412 and stretching 413. When scaling 412 content with a 4:3 aspect ratio, the content is scaled until the width of the 4:3 content matches the width of the 16:9 display. This scaling 412 operation keeps the content of the image in the proper perspective. However, this results in the top and bottom of the 4:3 content being "cut off" when they spill beyond the visible area of the screen.

Stretching 413 is different, in that the images are indeed stretched, which alters the perspective of the same. Illustrating by example, the height of the 4:3 content may be held constant while the width is stretched to match width of the 16:9 display. This results in distortion of the image, causing things to become wider, fatter, and flatter. By contrast, changing the aspect ratio 402 changes the proportional relationship of the height and width of the image itself. Thus, the aspect ratio 402 is not simply a measurement of height and width. To the contrary, it is the smallest usable ratio of the major dimension to the minor dimension. Accordingly, in most embodiments changing an image orientation 401, an aspect ratio 402, selecting a region of interest 207, and applying a crop mask 410 will be the most desirable operations occurring at step 213. However, for completeness, it should be noted that other processes, including magnifying 411, scaling 412, and stretching 413 can also be used as well.

Turning now back to FIG. 2, in this example step 213 includes at least transitioning the aspect ratio (402) of the one or more images 203 from the first aspect ratio 205 of 4:3 to the second aspect ratio 206 of 16:9 aspect ratio to create the one or more modified images 217. Additionally, since the field of view 202 of the image capture device 201 of the tablet computer 111 happens to be set to an ultra-wide setting, with the amount of content captured by the image capture device 201 of the tablet computer 111 being wide enough to make participant 110 look small on the display 204 of the laptop computer 112 without modification, step 213 also includes cropping the one or more images 203 with a crop mask (410) matching the content presentation orientation of the display 204 of the laptop computer 112 to create one or more cropped images in the one or more modified images 217.

In one or more embodiments, the crop mask (410) not only matches the content presentation orientation of the display 204 of the laptop computer (here, a 16:9 aspect ratio landscape orientation), but is also positioned such that participant 110 is generally centered within the cropped images of the one or more modified images 217. To accomplish this, in one or more embodiments the one or more processors of the tablet computer 111 identify a region of interest 207 within the one or more images 203 captured by the image capture device 201 of the tablet computer 111 and center the crop mask (410) around the region of interest 207 at step 213. Said differently, at the one or more processors of the tablet computer 111 determine the region of interest 207 within the one or more images 203 and position the crop mask (410) such that region of interest 207 is situated within the one or more cropped images and depicts a subject of the one or more cropped images.

As such, the one or more modified images 217 presented on the display 204 of the laptop fit the 16:9 aspect ratio perfectly and include only a region of interest 207 where the subject, i.e., participant 110, is situated substantially in the center of this region of interest 207. Thus, the tablet computer 111 provides one or more images 203 to the laptop computer 112 for presentation on the display 204 of the laptop that are perfectly configured for videoconferencing presentations.

At step 214, the one or more processors of the tablet computer 111 cause the communication device of the tablet computer 111 to deliver the one or more modified images 217 to the laptop computer 112 for presentation on the display 204 of the laptop computer 112. The one or more processors may optionally receive, at step 215, user input from participant 110 if any of the modifications made at step 213 were sub-optimal. The method 200 can repeat thereafter.

Thus, the method 200 of FIG. 2 can include detecting, with one or more processors of the tablet computer 111, a communication device of the tablet computer 111 electronically in communication with the laptop computer 112, which functions as a content presentation companion device operating as a display for the tablet computer 111 while an image capture device 201 of the tablet computer 111 captures one or more images 203 from an environment of the tablet computer 111. The method 200 also includes determining, by the one or more processors of the tablet computer 111 from signals received from the laptop computer 112 by the communication device, one or more content input parameters requested by the laptop computer 112 that differ from at least one content output parameter of the image capture device 201.

So as to create one or more modified images 217 that optimally present the one or more images 203 on the display 204 of the laptop computer 112, the one or more processors of the tablet computer 111 then alter the one or more images 203 to create one or more altered or modified images 217 meeting the one or more content input parameters required for the presentation on the laptop computer 112.

Figure 5:
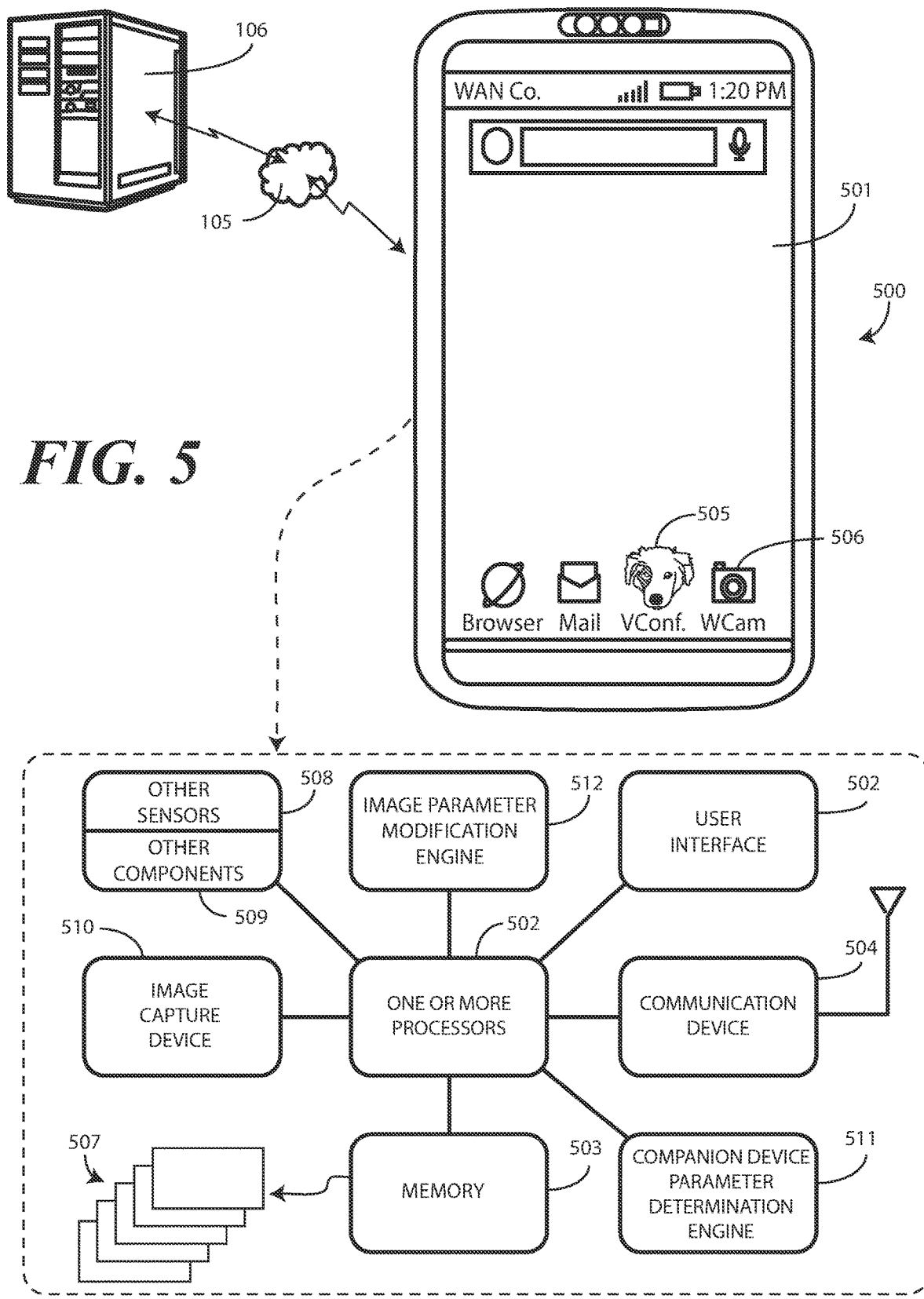
FIG. 5 illustrates one explanatory electronic device in accordance with one or more embodiments of the disclosure.

Turning now to FIG. 5, illustrated therein is one explanatory electronic device 500 configured in accordance with one or more embodiments of the disclosure. Like the tablet computer (111) of FIG. 2 above, the electronic device 500 of FIG. 5 can operate as a primary video input conveying images of a participant of a videoconference during the videoconference. The electronic device 500 can effectively operate as a "webcam" when another content presentation device is operating as a primary display for the electronic device 500.

The electronic device 500 of FIG. 5 is a portable electronic device. For illustrative purposes, the electronic device 500 is shown as a smartphone. However, the electronic device 500 could be any number of other devices as well. As shown above with reference to FIG. 2, the electronic device 500 could instead be configured as a tablet computer (111). Still other types of electronic devices can be configured in accordance with one or more embodiments of the disclosure as will be readily appreciated by those of ordinary skill in the art having the benefit of this disclosure.

This illustrative electronic device 500 includes a display 501. The display 501 may optionally be touch sensitive. When the display 501 is touch sensitive, the display 501 can serve as a primary user interface of the electronic device 500. Users can deliver user input to the display 501 of such an embodiment by delivering touch input from a finger, stylus, or other objects disposed proximately with the display 501.

In one embodiment, the display 501 is configured as an active-matrix organic light emitting diode (AMOLED) display. However, it should be noted that other types of displays, including liquid crystal displays, would be obvious to those of ordinary skill in the art having the benefit of this disclosure. Where the electronic device 500 is configured with a keyboard and/or mouse, such as when the electronic device 500 is configured as a computer, the keyboard and/or mouse can serve as the primary user interface.

A block diagram schematic of the electronic device 500 is also shown in FIG. 5. The block diagram schematic can be configured as a printed circuit board assembly disposed within the device housing of the electronic device 500. Various components can be electrically coupled together by electrical conductors or a bus disposed along one or more printed circuit boards.

In one or more embodiments, the electronic device 500 includes one or more processors 502. In one embodiment, the one or more processors 502 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 500. Each of the application processor and the auxiliary processor(s) can be configured to process and execute executable software code to perform the various functions of the electronic device 500. A storage device, such as memory 503, can optionally store the executable software code used by the one or more processors 502 during operation.

The electronic device 500 also includes a communication device 504 that can be configured for wired or wireless communication with one or more other devices or networks. The networks can include a wide area network, a local area network, and/or personal area network. The communication device 504 may also utilize wireless technology for communication, such as, but are not limited to, peer-to-peer or ad hoc communications such as HomeRF, Bluetooth and IEEE 802.11, and other forms of wireless communication such as infrared technology. The communication device 504 can include wireless communication circuitry, one of a receiver, a transmitter, or transceiver, and one or more antennas.

In one embodiment, the one or more processors 502 can be responsible for performing the primary functions of the electronic device 500. For example, in one embodiment the one or more processors 502 comprise one or more circuits operable with one or more user interface devices, which can include the display 501, to engage in videoconferences by transmitting, receiving, and presenting images, video, or other presentation information. The executable software code used by the one or more processors 502, including that associated with a videoconference application 505 or a webcam application 506, can be configured as one or more modules 507 that are operable with the one or more processors 502. Such modules 507 can store instructions, control algorithms, logic steps, and so forth.

In one embodiment, the one or more processors 502 are responsible for running the operating system environment of the electronic device 500. The operating system environment can include a kernel and one or more drivers, and an application service layer, and an application layer. The operating system environment can be configured as executable code operating on one or more processors or control circuits of the electronic device 500. The application layer can be responsible for executing application service modules. The application service modules may support one or more applications or "apps," such as the videoconference application 505 or webcam application 506.

The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 502 may generate commands or execute control operations based upon user input received at the user interface. Moreover, the one or more processors 502 may process the received information alone or in combination with other data, such as the information stored in the memory 503.

The electronic device 500 can include one or more sensors 508. The one or more sensors 508 may include a microphone, an earpiece speaker, and/or a second loudspeaker. The one or more sensors 508 may also include touch actuator selection sensors, proximity sensors, a touch pad sensor, a touch screen sensor, a capacitive touch sensor, and one or more switches. Touch sensors may be used to indicate whether any of the user actuation targets present on the display 501, including the audio difficulties user actuation targets described above, are being actuated. The other sensors 508 can also include audio sensors and video sensors (such as a camera).

Other components 509 operable with the one or more processors 502 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 509 can also include an audio input/processor. The audio input/processor can include hardware, executable code, and speech monitor executable code in one embodiment. The audio input/processor can include, stored in memory 503, basic speech models, trained speech models, or other modules that are used by the audio input/processor to receive and identify voice commands that are received with audio input captured by an audio input/processor, one example of which is a microphone of the one or more sensors 508. In one embodiment, the audio input/processor can include a voice recognition engine. Regardless of the specific implementation utilized in the various embodiments, the audio input/processor can access various speech models to identify speech commands in one or more embodiments.

To capture video for a content presentation companion device or other companion electronic device, such as during a videoconference, in one or more embodiments the electronic device 500 includes an image capture device 510 or another image capture device. The electronic device 500 can optionally include a depth imager as well.

In one embodiment, the image capture device 510 comprises a two-dimensional imager configured to receive at least one image of a person within an environment of the electronic device 500. In one embodiment, the image capture device 510 comprises a two-dimensional RGB imager. In another embodiment, the image capture device 510 comprises an infrared imager. Other types of imagers suitable for use as the image capture device 510 of the electronic device 500 will be obvious to those of ordinary skill in the art having the benefit of this disclosure.

In one or more embodiments, the electronic device 500 includes a companion device parameter determination manager 511. In one or more embodiments, the companion device parameter determination manager 511 detects, the communication device 504 being electronically in communication with a content presentation companion device operating as a display for the electronic device 500. In one or more embodiments, the companion device parameter determination manager 511 detects the communication device 504 electrically in communication with the content presentation companion device operating as a primary display for the electronic device 500 while the image capture device 510 captures one or more images from an environment of the electronic device 500.

Additionally, in one or more embodiments the companion device parameter determination manager 511 determines, from signals received from the content presentation companion device by the communication device 504, one or more content input parameters requested by the content presentation companion device that differ from one or more content output parameters associated with the image capture device 510. Examples of these one or more content input parameters include an aspect ratio, an image orientation, and a field of view. Other examples of such content input parameters were described above with reference to FIG. 3.

In one or more embodiments, the electronic device 500 also includes an image parameter modification engine 512. In one or more embodiments, the image parameter modification engine 512 alters the one or more images captured by the image capture device 510 to create one or more altered images meeting the one or more content input parameters required for the one or more images to be presented on the content presentation companion device. In one or more embodiments, the image parameter modification engine 512 changes the one or more content output parameters prior to the communication device 504 delivering the one or more images to the content presentation companion device for presentation.

Illustrating by example, in one or more embodiments the image parameter modification engine 512 modify the one or more images by changing an aspect ratio of the one or more images. The image parameter modification engine 512 may change a 4:3 aspect ratio to a 16:9 aspect ratio, a 3:4 aspect ratio, or a 9:16 aspect ratio, for example. The image parameter modification engine 512 may also alter the one or more images by transitioning an image orientation from a portrait image orientation to a landscape image orientation. In one or more embodiments, the image parameter modification engine 512 modifies the one or more images in response to signals received from a content presentation companion device through the communication device which are processed by the companion device parameter determination manager 511 and which request at least one content input parameter to be different from the one or more content output parameters associated with the image capture device 510.

In one or more embodiments, the image parameter modification engine 512 crop the one or more images captured by the image capture device 510 with a crop mask (410) matching a content presentation orientation of the content presentation companion device acting as the primary display for the electronic device 500 to create one or more cropped images. The image parameter modification engine 512 can also determine a region of interest (207) within the one or more images. Where this occurs, the image parameter modification engine 512 can position the crop mask (410) such that the region of interest (207) is situated within the one or more cropped images. In one or more embodiments, the region of interest (207) depicts a subject of the one or more cropped images.

The image parameter modification engine 512 can also detect movement of objects within the region of interest (207). Illustrating by example, where the one or more cropped images comprise a plurality of images, the image parameter modification engine 512 can detect movement of a subject within at least some cropped images of the plurality of cropped images. When this occurs, the image parameter modification engine 512 can move the crop mask (410) to maintain depictions of the subject that are substantially centered or perfectly centered within the plurality of cropped images.

In one or more embodiments, the image parameter modification engine 512 perform these functions under only certain conditions. Illustrating by example, in one or more embodiments the one or more sensors 508 include a motion sensor that is configured to determine when the electronic device 500 is moving. Where the electronic device 500 is so equipped, the image parameter modification engine 512 can alter the one or more images captured by the image capture device 510 to create the one or more altered images meeting the one or more content input parameters required for presentation of the one or more altered images on the content presentation companion device only when the electronic device 500 is substantially stationary or, alternatively, perfectly stationary while the image capture device 510 captures the one or more images.

The same can occur with reference to a docking station, such as the one described above with reference to FIG. 2. In one or more embodiments, the image parameter modification engine 512 alters the one or more images captured by the image capture device 510 to create one or more altered images meeting the one or more content input parameters required by the content presentation companion device for presentation only when the one or more sensors 508 detect that the electronic device 500 is coupled to a docking station. Alternatively, the image parameter modification engine 512 may be configured to alter the one or more images captured by the image capture device 510 to create one or more altered images meeting the one or more content input parameters required by the content presentation companion device for presentation only when the one or more sensors 508 detect that the electronic device 500 is coupled to a docking station while the electronic device 500 is engaged in a videoconference.

In one or more embodiments, the companion device parameter determination manager 511 and/or the image parameter modification engine 512 is operable with the one or more processors 502. In some embodiments, the one or more processors 502 can control the companion device parameter determination manager 511 and/or the image parameter modification engine 512. In other embodiments, the companion device parameter determination manager 511 and/or the image parameter modification engine 512 can operate independently, sensing contextual information from the one or more sensors 508 and/or receiving or identifying contextual information from remote servers and electronic devices using the communication device 504 to the one or more processors 502. The companion device parameter determination manager 511 and/or the image parameter modification engine 512 can receive data from the various sensors 508. In one or more embodiments, the one or more processors 502 are configured to perform the operations of the companion device parameter determination manager 511 and/or the image parameter modification engine 512.

The companion device parameter determination manager 511 and/or the image parameter modification engine 512 can be operable with the various sensors 508 to detect, infer, capture, and otherwise determine persons, actions, demonstration operations, and other contextual information that are occurring in an environment about the electronic device 500. For example, where included one embodiment of the companion device parameter determination manager 511 and/or the image parameter modification engine 512 determines that videoconference is occurring based upon assessed contexts and frameworks using adjustable algorithms of context assessment employing information, data, and events. These assessments may be learned through repetitive data analysis. These assessments can be used to obtain additional contextual information when the contextual information changes in one or more embodiments. The companion device parameter determination manager 511 and/or the image parameter modification engine 512 can comprise an artificial neural network or other similar technology in one or more embodiments.

It is to be understood that FIG. 5 is provided for illustrative purposes only and for illustrating components of one electronic device 500 in accordance with embodiments of the disclosure and is not intended to be a complete schematic diagram of the various components required for an electronic device. Therefore, other conferencing system terminal devices in accordance with embodiments of the disclosure may include various other components not shown in FIG. 5 or may include a combination of two or more components or a division of a particular component into two or more separate components, and still be within the scope of the present disclosure.

The electronic device 500 can be operable with a video conferencing system server complex 106 across a network 105. The video conferencing system server complex 106 can be configured with performing processor-intensive methods, operations, steps, functions, or procedures associated with the presentation, actuation, and management of indicia during a videoconference. Illustrating by example, the video conferencing system server complex 106 can be configured to receive one or more images in a video feed of a videoconference across a network. A communication device can then deliver the one or more videoconference feeds to other conferencing system terminal devices.

Figure 6:
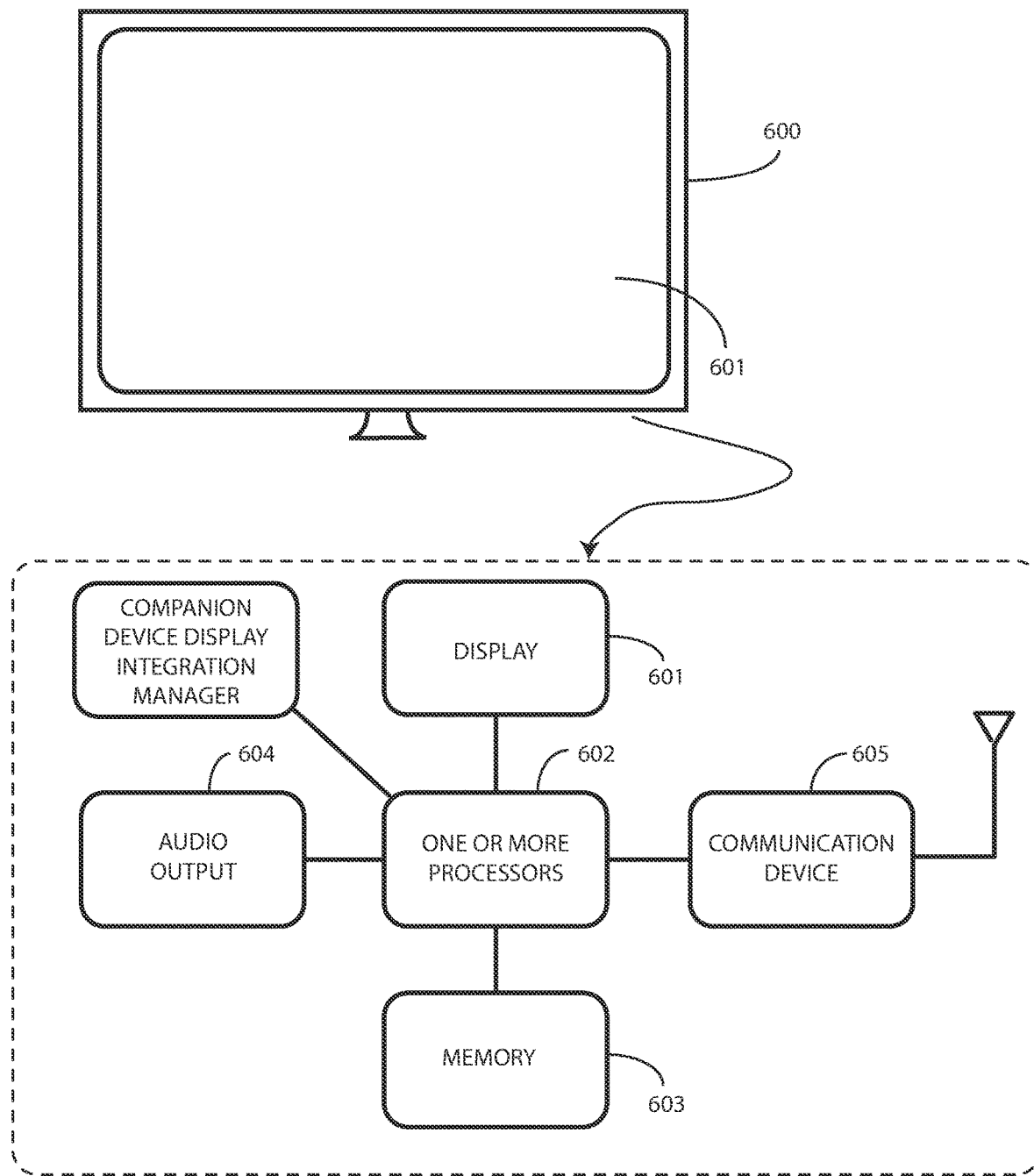
FIG. 6 illustrates one explanatory companion device in accordance with one or more embodiments of the disclosure.

Embodiments of the disclosure contemplate that electronic devices configured as described herein and used in videoconferencing applications can be operable with companion devices in a "ready for" environment. Illustrating by example, the electronic device 500 can include a companion device display integration manager. The companion device display integration manager can be used to communicate with a companion electronic device, one example of which is a content presentation companion device. Turning now to FIG. 6, illustrated therein is one such content presentation companion device 600.

In this illustrative embodiment, the content presentation companion device 600 comprises a color video monitor. In other embodiments, the content presentation companion device 600 can take other forms. Illustrating by example, the content presentation companion device 600 can be a television, a computer display, a laptop display, a tablet computer, or a projector projecting content onto a screen. Other examples of content presentation companion devices 600 will be obvious to those of ordinary skill in the art having the benefit of this disclosure. Regardless of configuration, in one or more embodiments the content presentation companion device 600 includes one or more processors 602, a display 601, a memory 603, an audio output 604, and a communication device 605 capable of wired or wireless communication with an electronic device such as the electronic device (500) of FIG. 5 or the tablet computer (111) of FIG. 2.

In one or more embodiments, when coupled by a wireless connection to such an electronic device (500), the content presentation companion device 600 can function as an auxiliary display for the electronic device (500). The electronic device (500) can receive content, one example of which includes one or more videoconference feeds, from a terrestrial broadcast network, cable television network, videoconference server, Internet streaming service, or combinations thereof, and redirect this content to the content presentation companion device 600 (using its companion device display integration manager) since its display 601 is larger than the display (501) of the electronic device 500. In one or more embodiments, content flows from the electronic device 500 to the content presentation companion device 600 through the communication device 605.

Figure 7:
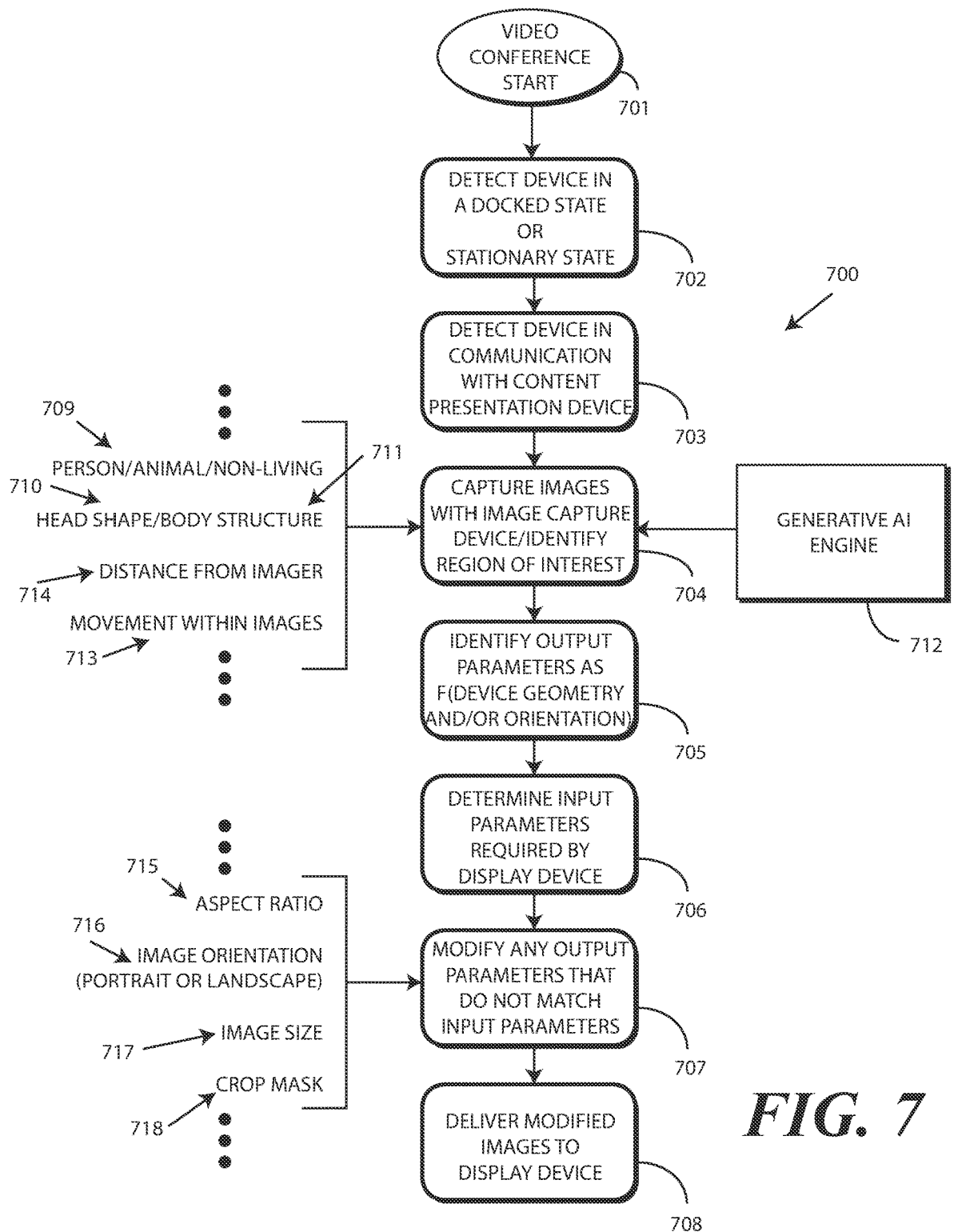
FIG. 7 illustrates one explanatory method in accordance with one or more embodiments of the disclosure.

Turning now to FIG. 7, illustrates therein is one explanatory method 700 in accordance with one or more embodiments of the disclosure. Beginning at stage 701, a videoconference is initiated. In one or more embodiments, the videoconference occurs across a network, one example of which is network (105) shown in FIG. 1. In one or more embodiments, the videoconference includes one or more videoconference feeds associated therewith. These videoconference feeds can include audio content and/or video content.

In one or more embodiments, the initiation of the videoconference at stage 701 includes at least one electronic device that is being used as a "webcam" by a participant while a content presentation companion device is being used as a primary display of the electronic device. Illustrating by example, a participant may use the electronic device (500) of FIG. 6, employing its image capture device (510) to capture one or more images of a subject while using the content presentation companion device (600) of FIG. 6 as the primary display of this hybrid system due to the fact that the display (601) of the content presentation companion device (600) is much larger than the display (501) of the electronic device (500).

In one or more embodiments, the image capture device of the electronic device engaged in the videoconference begins capturing image of a subject participating in the videoconference at step 704. A communication device of the electronic device then transmits the images to at least one remote electronic device engaged in the videoconference, while also delivering the images to the content presentation companion device for presentation on its display at step 708.

Similarly, communication devices of those remote electronic devices transmit one or more videoconference feeds to the communication device of the electronic device, each of which can include an audio feed and a video feed depicting the one or more subjects engaged in the videoconference from the other conferencing system terminal devices engaged in the videoconference. The communication device of the electronic device delivers these videoconference feeds to the content presentation companion device for presentation on the display of the content presentation companion device.

At optional step 702, one or more processors of the electronic device determine whether the electronic device is docked or substantially stationary while the one or more images are being captured by the image capture device. Illustrating by example, in one or more embodiments step 702 comprises detecting the electronic device being coupled to a docking station while capturing the one or more images during the videoconference. Step 702 can also comprise determining, using one or more sensors of the electronic device, whether the electronic device is moving, is substantially stationary, or is perfectly stationary. In one or more embodiments, these determinations can be used as a condition precedent for altering the one or more images being captured by the image capture device prior to the communication device delivering the same to the content presentation companion device.

At step 703, the one or more processors of the electronic device detect the content presentation companion device being used as a primary display for the electronic device. As noted above, one or more images are captured by an image capture device of the electronic device at step 704. In one or more embodiments, step 703 and step 704 can occur in tandem. Step 703 can determine that a communication device of the electronic device is electronically in communication with a content presentation companion device operating as a display or primary display of the electronic device while an image capture device of the electronic device captures one or more images from an environment of the electronic device at step 704.

In one or more embodiments, step 704 also comprises determining a region of interest within the one or more images. In one or more embodiments, the region of interest is defined by depictions of a subject 709, which could be any of a person, an animal, a non-living object, or combinations thereof. Where the subject 709 comprises a person, an orientation of the person within the region of interest can be determined by a head shape 710 of the person. Where the subject 709 is an animal, the orientation of the animal within the region of interest can be determined by a body structure 711 of the animal.

Step 704 can be performed by a generative artificial intelligence engine 712 that assists in identifying the region of interest, determining the orientation of the subject, movement of the subject, and so forth. Illustrating by example, in one or more embodiments the generative artificial intelligence engine 712 detect movement 713 of the subject 709 within the one or more images captured by the image capture device of the electronic device at step 704 and cause the region of interest to move to keep the subject 709 substantially centered within the region of interest. Similarly, the generative artificial intelligence engine 712 can use a distance 714 between the subject 709 and the image capture device of the electronic device as a factor in identifying the region of interest, and so forth.

In one or more embodiments, one or both of the electronic device carrying the image capture device capturing the one or more images at step 704 and the content presentation companion device detected at step 703 are equipped with a generative artificial intelligence engine 712 that includes an artificial neural network or other similar technology that detects the contextual information and identifies, as a function of this contextual information, a region of interest and/or subject 709 situated within the one or more images captured at step 704.

At step 705, one or more processors of the electronic device carrying the image capture device capturing the images at step 704 determine one or more content output parameters associated with the image capture device. Examples of the one or more content output parameters include an aspect ratio of the image capture device, an orientation of the image capture device in three-dimensional space, and a field of view of the image capture device. Other examples of content output parameters were described above with reference to FIG. 3. Still others will be obvious to those of ordinary skill in the art having the benefit of this disclosure.

At step 706, one or more processors of the electronic device carrying the image capture device capturing the images at step 704 determine one or more content input parameters requested by the content presentation companion device that are required for presentation of content on the display of the content presentation companion device. In one or more embodiments, at least one content input parameter differs from at least one content output parameter associated with the image capture device. Thus, at step 706 the one or more processors of the electronic device carrying the image capture device capturing the one or more images at step 704 receive electronic signals from the content presentation companion device that include a request for one or more content input parameters that differ from at least one content output parameter associated with the image capture device.

At step 707, the one or more processors of the electronic device carrying the image capture device being used as the webcam for the content presentation companion device alter the one or more images captured at step 704 to create one or more altered images meeting the one or more content input parameters identified at step 706 and required for presentation of the one or more altered images on the display of the content presentation companion device. This alteration can occur in a variety of ways.

In one or more embodiments, the one or more content input parameters identified at step 706 and required for presentation of the one or more altered images on the display of the content presentation companion device that differ from the one or more content output parameters of the image capture device comprise an aspect ratio 715 of the one or more images captured at step 704. Accordingly, in one or more embodiments the altering occurring at step 707 comprises changing the aspect ratio 715 of the one or more images captured at step 704 to a different aspect ratio required for presentation of the one or more altered images on the display of the content presentation companion device.

In one or more embodiments, the one or more content input parameters identified at step 706 and required for presentation of the one or more altered images on the display of the content presentation companion device that differ from the one or more content output parameters comprise an image orientation 716. Accordingly, in one or more embodiments the altering occurring at step 707 comprises changing the image orientation 716 of the one or more images captured at step 704 to a different image orientation required for presentation of the one or more altered images on the display of the content presentation companion device. This step 707 can comprise changing a portrait image orientation to a landscape image orientation, or vice versa.

In one or more embodiments, the one or more content input parameters identified at step 706 and required for presentation of the one or more altered images on the display of the content presentation companion device that differ from the one or more content output parameters of the image capture device comprise an image size 717 of the one or more images captured at step 704. Accordingly, in one or more embodiments the altering occurring at step 707 comprises changing the image size 717 of the one or more images captured at step 704 to a different image size required for presentation of the one or more altered images on the display of the content presentation companion device. In one or more embodiments, this comprises cropping the one or more images captured at step 704 with a crop mask 718 matching the content orientation of the content presentation companion device to create one or more cropped images at step 707. In one or more embodiments, the crop mask 718 is positioned such that the region of interest identified at step 704 is situated within the one or more cropped images. Where the region of interest depicts a subject 709 of the region of interest, this results in the depictions of the subject 709 being situated within the crop mask 718. Where the generative artificial intelligence engine 712 detects movement of the subject 709 and/or region of interest at step 704, step 707 can comprise moving the crop mask 718 to maintain depictions of the subject substantially centered within the one or more cropped images.

As noted above in the description of step 702, in one or more embodiments a docked operating condition or a substantially stationary condition or a perfectly stationary condition of the electronic device is a prerequisite for step 708 to occur. Accordingly, where optional step 702 is included, in one or more embodiments step 708 alters the one or more images to create the one or more altered images for presentation on the display of the content presentation companion device only when the electronic device is substantially stationary. In another embodiment, step 708 alters the one or more images to create the one or more altered images for presentation on the display of the content presentation companion device only when the electronic device is perfectly stationary. In another embodiment, step 708 alters the one or more images to create the one or more altered images for presentation on the display of the content presentation companion device only when the electronic device is coupled to a docking station and engaged in a videoconference.

At step 708, one or more processors of the electronic device carrying the image capture device capturing the one or more images at step 704 cause a communication device of the electronic device to deliver the one or more altered images to the content presentation companion device for presentation on the display of the content presentation companion device. In one or more embodiments, these one or more altered images comprise one or more videoconference images. In one or more embodiments, the one or more processors also cause the communication device of the electronic device to deliver the one or more images captured at step 704 to at least one remote electronic device engaged in the videoconference as well.

Turning now to FIGS. 8-9, illustrated therein is another electronic device 800 configured in accordance with one or more embodiments of the disclosure. To this point, the electronic devices described above have had rigid device housings that maintain a single geometric form factor. However, embodiments of the disclosure contemplate that electronic devices can be deformable as well. When configured as deformable devices, the geometric form factor of the electronic device can affect the one or more content output parameters associated with the image capture device, as the image capture device may have different content output parameters when deformed than when in an undeformed state. To illustrate by a simple example, pivoting a first device housing relative to a second device housing about a hinge from a closed position to an axially displaced open position may invert the image capture device, thereby affecting its orientation in three-dimensional space.

The electronic device 800 of FIGS. 8 and 9 includes a first device housing 802 and a second device housing 803. In one or more embodiments, a hinge 801 couples the first device housing 802 to the second device housing 803. In one or more embodiments, the first device housing 802 is selectively pivotable about the hinge 801 relative to the second device housing 803. For example, in one or more embodiments the first device housing 802 is selectively pivotable about the hinge 801 between a closed position, shown and described below with reference to FIG. 10, a partially open position, shown and described below with reference to FIG. 11, and an open position, shown and described below with reference to FIG. 12.

In one or more embodiments the first device housing 802 and the second device housing 803 are manufactured from a rigid material such as a rigid thermoplastic, metal, or composite material, although other materials can be used. Still other constructs will be obvious to those of ordinary skill in the art having the benefit of this disclosure. In the illustrative embodiment of FIGS. 8-9, the electronic device 800 includes a single hinge 801. However, in other embodiments two or more hinges can be incorporated into the electronic device 800 to allow it to be folded in multiple locations.

While the illustrative electronic device 800 of FIGS. 8-9 includes a hinge 801, embodiments of the disclosure are not so limited. In other embodiments, the electronic device 800 will be bendable, but will not include a hinge 801, such as when the first device housing 802 and the second device housing 803 are a first device housing portion and a second device housing portion linked by a deformable portion of a single device housing manufactured from bendable materials. In still other embodiments, the electronic device 800 can be bendable via a combination of hinge components and non-hinge components.

Illustrating by example, in another embodiment the electronic device 800 of FIGS. 8-9 includes a single housing that is flexible. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

The illustrative electronic device 800 of FIGS. 8-9 includes multiple displays. A first display 804, also referred to as the interior display or the front-facing display, is concealed when the first device housing 802 is pivoted about the hinge 801 relative to the second device housing 803 to a closed position. For example, the first display 804 is concealed in FIG. 10 below. This first display 804 is then revealed when the first device housing 802 is pivoted about the hinge 801 relative to the second device housing 803 from the closed position to an axially displaced open position. Thus, the first display 804 is revealed as the electronic device 800 transitions from the closed position of FIG. 10 to the open position of FIG. 12.

In one or more embodiments, the electronic device 800 also includes at least a second display 805. In the illustrative embodiment of FIGS. 8-9, the second display 805 can be referred to as an exterior display or rear-facing display, as the second display 805 is exposed both when the first device housing 802 and the second device housing 803 are pivoted about the hinge 801 to the closed position or the axially displaced open position. Thus, the second display 805 is exposed both in the axially displaced open position of FIG. 9 and the closed position of FIG. 10. In one or more embodiments, each of the first display 804 and the second display 805 is a high-resolution display.

While shown coupled to the first device housing 802, it should be noted that the second display 805 could be coupled to either of the first device housing 802 or the second device housing 803. In other embodiments, the second display 805 can be coupled to the first device housing 802, while a third display (not shown) is coupled to the second device housing 803. Thus, electronic devices configured in accordance with embodiments of the disclosure can include displays situated at different positions.

As with the second display 805, the first display 804 can also be coupled to either or both of the first device housing 802 or the second device housing 803. In this illustrative embodiment, the first display 804 is coupled to both the first device housing 802 and the second device housing 803 and spans the hinge 801. In other embodiments, the "first" display can be two displays, with one coupled to the first device housing 102 and another coupled to the second device housing 803. In either case, this first display 804 is considered to be an "interior" display because it is concealed when the first device housing 802 and the second device housing 803 are in the closed position.

In one or more embodiments, either or both of first display 804 and second display 805 can be touch sensitive. Where this is the case, users can deliver user input to one or both of the first display 804 or the second display 805 by delivering touch input from a finger, stylus, or other objects disposed proximately with the first display 804 or the second display 805.

In the illustrative embodiment of FIGS. 8-9, since the first display 804 spans the hinge 801, it is configured to be flexible. For instance, in one embodiment the first display 804 is configured as an organic light emitting diode (OLED) display fabricated on a flexible plastic substrate. This allows the first display 804 to be flexible so as to deform when the first device housing 802 pivots about the hinge 801 relative to the second device housing 803. However, it should be noted that other types of displays would be obvious to those of ordinary skill in the art having the benefit of this disclosure. In other embodiments conventional, rigid displays can be disposed to either side of the hinge rather than using a flexible display.

In one or more embodiments, the first display 804 is configured as an OLED constructed on flexible plastic substrates to allow the first display 804 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the first display 804 may be formed from multiple layers of flexible material such as flexible sheets of polymer or other materials.

In this illustrative embodiment, the first display 804 is coupled to the first device housing 802 and the second device housing 803. Accordingly, the first display 804 spans the hinge 801 in this embodiment. In one or more embodiments, the first display 804 can instead be coupled to one, or two, spring-loaded, slidable trays that situate within one or both of the first device housing 802 and the second device housing 803. The use of one or two slidable trays advantageously allows the first display 804 to be placed in tension when the electronic device 800 is in the open position. This causes the first display 804 to be flat, rather than wavy due to mechanical memory effects, when the electronic device 800 is in the open position.

Features can be incorporated into the first device housing 802 and/or the second device housing 803. Examples of such features include image capture device 906, which in this embodiment is an exterior or rear-facing imager. The image capture device 906, which can be any number of types of image capture devices, has its lens situated such that it is directed away from a user who is holding the electronic device 800 and facing the second display 805. This allows the image capture device 906 to receive light directed toward the electronic device 800 from a location in front of the user when the user is holding the electronic device 800 and facing the first display 804.

In addition to the image capture device 906, a second, front-facing image capture device 806 can be positioned on the interior side of the electronic device 800 to receive light and images directed toward the first display 804. When a user is holding the electronic device 800 and looking at the first display 804, this second, front-facing image capture device 806 can be used to take a selfie without turning the electronic device 800 around. While two imagers are shown in the illustrative embodiment of FIGS. 8-9, it should be noted that embodiments of the disclosure can include additional imagers mounted in different positions that can be actuated to capture images from different angles.

Other examples of features that can be incorporated into the first device housing 102 and/or the second device housing 803 include an optional speaker port 901. While shown situated on the exterior of the electronic device 800 in FIG. 9, the optional speaker port 901 could also be placed on the interior side as well. In this illustrative embodiment, a user interface component 902, which may be a button or touch sensitive surface, can also be disposed along the exterior side of the second device housing 803. As noted, any of these features shown being disposed on the exterior side of the electronic device 800 could be located elsewhere, such as on the interior side or minor sides in other embodiments.

A block diagram schematic of the electronic device 800 would include one or more of the components illustrated and described above with reference to the block diagram schematic of FIG. 5. Since these components have already been described, they will not be again described here in the interest of brevity. However, additional components that the electronic device 800 of FIGS. 8 and 9 may include that the electronic device (500) of FIG. 5 did not include one or more flex sensors that detect a bending operation that causes the first device housing 802 to pivot about the hinge 801 relative to the second device housing 803, thereby transforming the electronic device 800 into a deformed geometry, such as that shown in FIGS. 10-11. The inclusion of flex sensors is optional, and in some embodiment flex sensors will not be included.

In one embodiment, the flex sensors comprise passive resistive devices manufactured from a material with an impedance that changes when the material is bent, deformed, or flexed. By detecting changes in the impedance as a function of resistance, the one or more processors of the electronic device 800 can use the one or more flex sensors to detect bending of the first device housing 802 about the hinge 801 relative to the second device housing 803.

In one or more embodiments, each flex sensor comprises a bi-directional flex sensor that can detect flexing or bending in two directions. In one embodiment, the one or more flex sensors have an impedance that increases in an amount that is proportional with the amount it is deformed or bent.

In one embodiment, each flex sensor is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor bends, the impedance of the resistive layer changes, thereby altering the flow of current for a given voltage. The one or more processors of the electronic device 800 can detect this change to determine an amount of bending. Taps can be added along each flex sensor to determine other information, including the amount of bending, the direction of bending, and so forth. The flex sensor can further be driven by time-varying signals to increase the amount of information obtained from the flex sensor as well. While a multi-layered device as a flex sensor is one configuration suitable for detecting at least a bending operation occurring to deform the electronic device 800 and a geometry of the electronic device 800 after the bending operation, others can be used as well. Additionally, other types of flex sensors will be obvious to those of ordinary skill in the art having the benefit of this disclosure.

Figure 10:
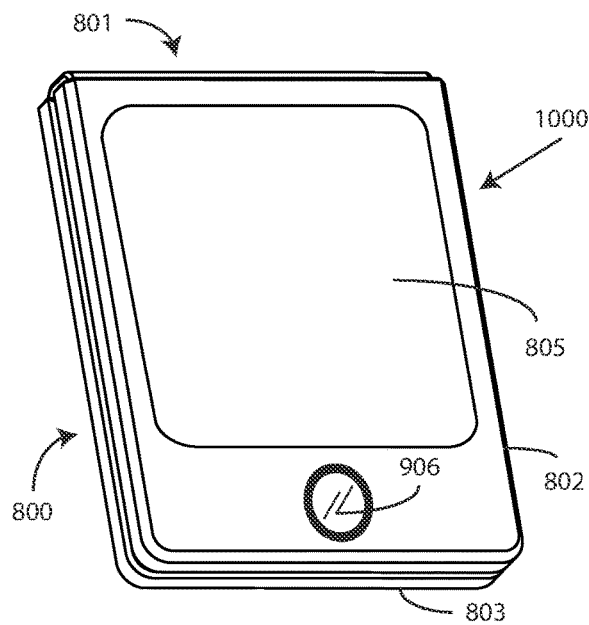
FIG. 10 illustrates the electronic device of FIG. 8 in a closed position.

Turning now to FIG. 10, illustrated therein is the electronic device 800 in a closed state. In this state, the first device housing 802 has been pivoted about the hinge 801 toward the second device housing 803 to a closed position 1000. When in the closed position 1000, a front surface of the first device housing 802 abuts a front surface of the second device housing 803. When in the closed position 1000, the exterior display, i.e., second display 805, and the exterior image capture device 906 are visible, exposed, and accessible by a user. By contrast, when in the closed position 1000, the interior display, i.e., first display (804), and the second image capture device (806) are concealed, are not visible, and are inaccessible by a user. Effectively, in the closed position 1000 the first device housing 802 and the second device housing 803 are analogous to clam shells that have been shut by the claim, thereby giving rise to the "clamshell" style of device.

Figure 11:
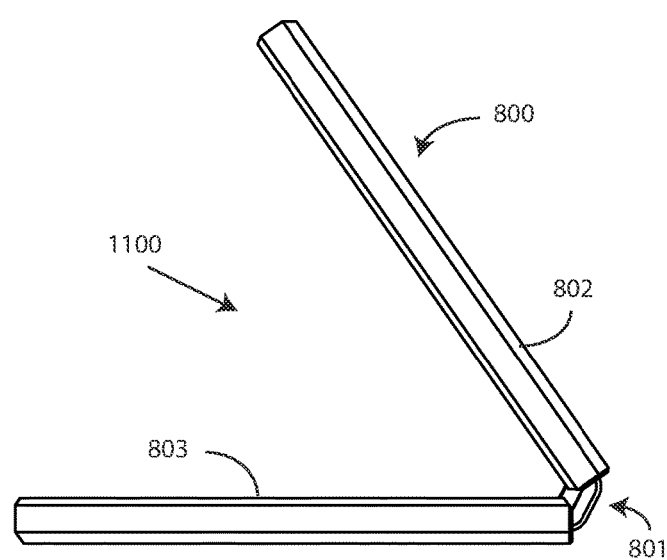
FIG. 11 illustrates the electronic device of FIG. 8 in a partially open position.

Turning now to FIG. 11, the electronic device 800 is shown being transitioned from the closed position (1000) of FIG. 10 to a partially opened position 1100. Specifically, the first device housing 802 is pivoting about the hinge 801 away from the second device housing 803 toward, but not fully yet to, an open position where the first device housing 802 is axially displaced about the hinge 801 from the second device housing 803. The position shown in FIG. 11 can be referred to as a "tent position."

Figure 12:
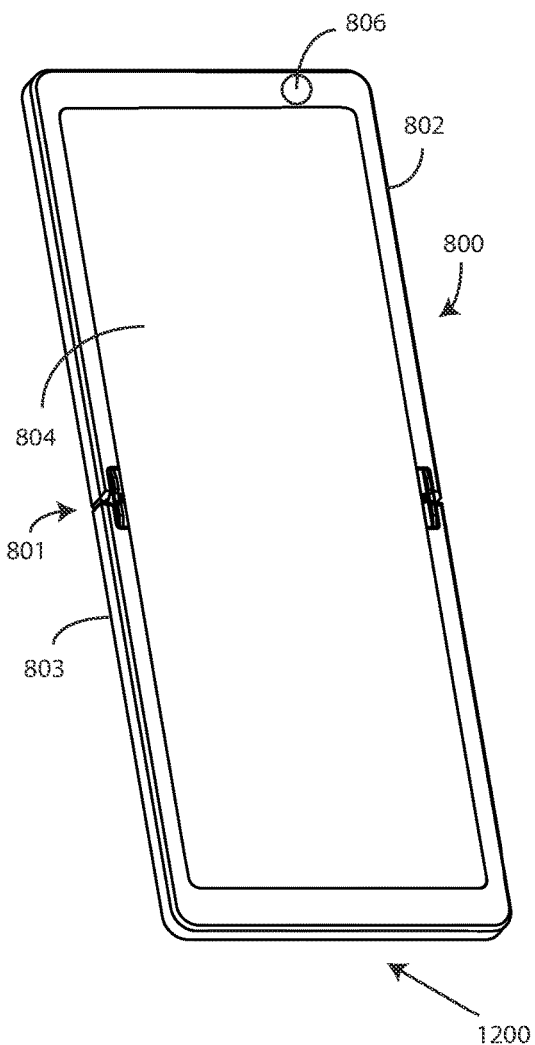
FIG. 12 illustrates the electronic device of FIG. 8 in an axially displaced open position.

Turning now to FIG. 12, illustrated therein is the electronic device 800 in an open position 1200 where the first device housing 802 is rotated about the hinge 801 so as to become axially displaced from the second device housing 803. In the open position, the first device housing 802 is rotated about the hinge 801 180-degrees out of phase with the second device housing 803 such that the first device housing 802 and the second device housing 803 effectively define a plane. The first display 804, being flexible, has been transitioned from a bent position into the elongated flat position show in FIG. 12. In one or more embodiments this occurs due to the action of one or more slidable trays (mentioned above), which can be disposed within one or both of the first device housing 802 and the second device housing 803.

As noted above with reference to FIG. 3, since the electronic device 800 is deformable between an axially displaced open position and a closed position, the geometric form factor can become a factor in determining the one or more content output parameters associated with the image sensor of either the first image capture device (906) or the second image capture device 806. 302. Since the electronic device 800 includes two image capture devices, during a video conference it is important to know within which field of view a subject is positioned. If positioned within the field of view of the second image capture device 806, the one or more content output parameters may be different than when the subject is positioned within the field of view of the first image capture device (906). Accordingly, to determine the one or more content output parameters of the image capture device capturing images of a subject, one or more processors of the electronic device 800 may initially determine within which field of view a subject is situated.

Additionally, pivoting the first device housing 802 relative to the second device housing 803 about the hinge 801 from the closed position to the axially displaced open position while holding the second device housing 803 in a palm will invert both image capture devices and make the first image capture device 806 unavailable for capturing images due to the fact that it is concealed in the closed position. Accordingly, a content output parameter associated with an image capture device capturing one or more images may be determined by the geometric form factor of the electronic device 800. Since people generally do not prefer to see a person upside down during a videoconference, in one or more embodiments the one or more content output parameters associated with an image capture device capturing images of a subject include the geometric form factor of the electronic device 800, such as whether it is in the axially displaced open position, the closed position, or the partially closed position.

Figure 13:
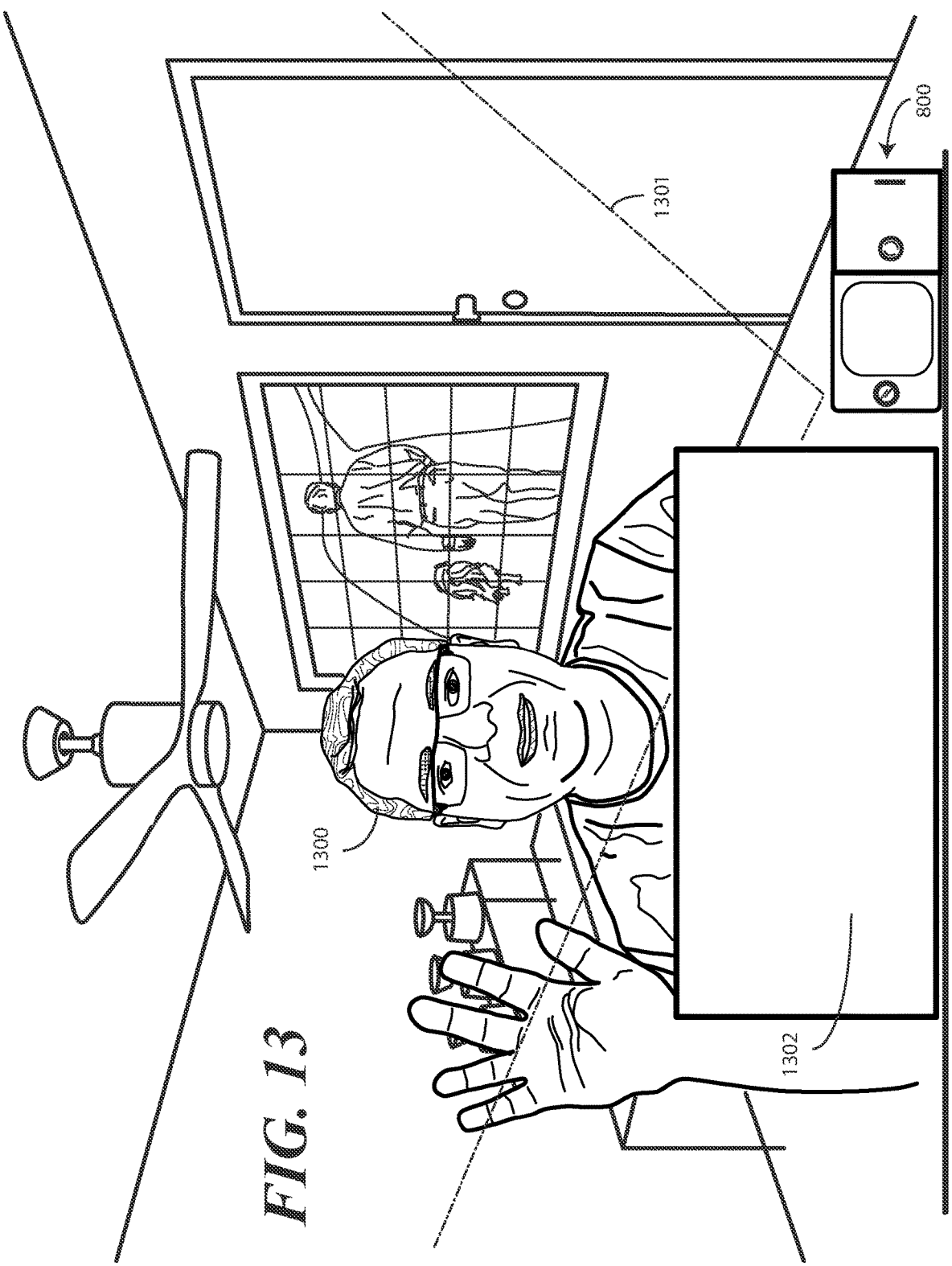
FIG. 13 illustrates one explanatory system in accordance with one or more embodiments of the disclosure.

Now that the various methods, systems, and devices associated with embodiments of the disclosure have been described, attention will be turned to a few examples to solidify the understanding of how embodiments of the disclosure operate in practice. Turning now to FIG. 13, illustrated therein is a person 1300 engaged in a videoconference. As shown in FIG. 13, the person 1300 uses the electronic device 800 of FIGS. 8-12 in the partially open position with the second image capture device (806) capturing one or more images 1301 of an environment of the electronic device 800. The electronic device 800 is being used as a webcam in a videoconference, while a larger monitor is being used as a content presentation companion device 1302. Since the electronic device 800 has a more advanced image capture device than the content presentation companion device 1302, the person 1300 prefers to use it to capture images to be used in the videoconference. However, since the display of the content presentation companion device 1302 is much larger than the first display (804) of the electronic device 800, the person 1300 prefers to use the content presentation companion device 1302 as a primary display in the videoconference so that he can more clearly see his friends, Dan, Bill, and Jeff, each of whom are engaged in the videoconference.

Since the electronic device 800 includes a first device housing 802 that is pivotable about a hinge 801 relative to a second device housing 803, the person 1300 has pivoted the electronic device 800 to a partially open position. Additionally, the person 1300 has placed the electronic device 800 sideways on the desk so that the electronic device 800 resembles a two-picture frame where the two picture frame portions are joined by the hinge. This orients the first image capture device (806) in the landscape orientation in three-dimensional space.

Initially during the videoconference, the person 1300 orients the content presentation companion device 1302 in the same orientation, namely, the landscape orientation as shown in FIG. 13. However, desiring maximum control and flexibility during videoconferences, the person 1300 has invested in a monitor that has a fancy stand and hinge mechanism that allows the content presentation companion device 1302 to be pivoted at will between the landscape orientation and the portrait orientation.

Meanwhile, the first image capture device (806) has an extremely wide field of view. Accordingly, it captures the person's entire living room when it captures one or more images. The first image capture device (806) even captures scenes through a panoramic window situated behind the person 1300. Additionally, it captures images of the person 1300 that run from thigh height well over the person's head to a ceiling fan. This is a very wide field of view.

Smelling something tasty cooking in the kitchen, the person 1300 elects to pivot the content presentation companion device 1302 from the landscape orientation shown in FIG. 13 to a portrait orientation, as it allows him to watch the goings-on in the kitchen that are occurring during the videoconference. The person 1300 figures that he will be able to see when the tasty treats being made in the kitchen thanks to the slimmer profile of the content presentation companion device 1302 being positioned in the portrait orientation while still staying dutifully engaged in the videoconference.

With a prior art system, since the electronic device 800 is in the landscape orientation with a wide field of view, doing this would result in a mismatch between the one or more content output parameters associated with the first image capture device (806) capturing the one or more images 1301 and the one or more content input parameters required by the content presentation companion device 1302 for presentation of the content on the display of the content presentation companion device 1302. Illustrating by example, if the landscape image orientation aspect ratio of the first image capture device (806) is 16:9, and the portrait image orientation aspect ratio of the content presentation companion device is 9:16, there would be a mismatch between at least one content output parameter associated with the first image capture device (806) and at least one content input parameter associated with the content presentation companion device 1302.

Figure 14:
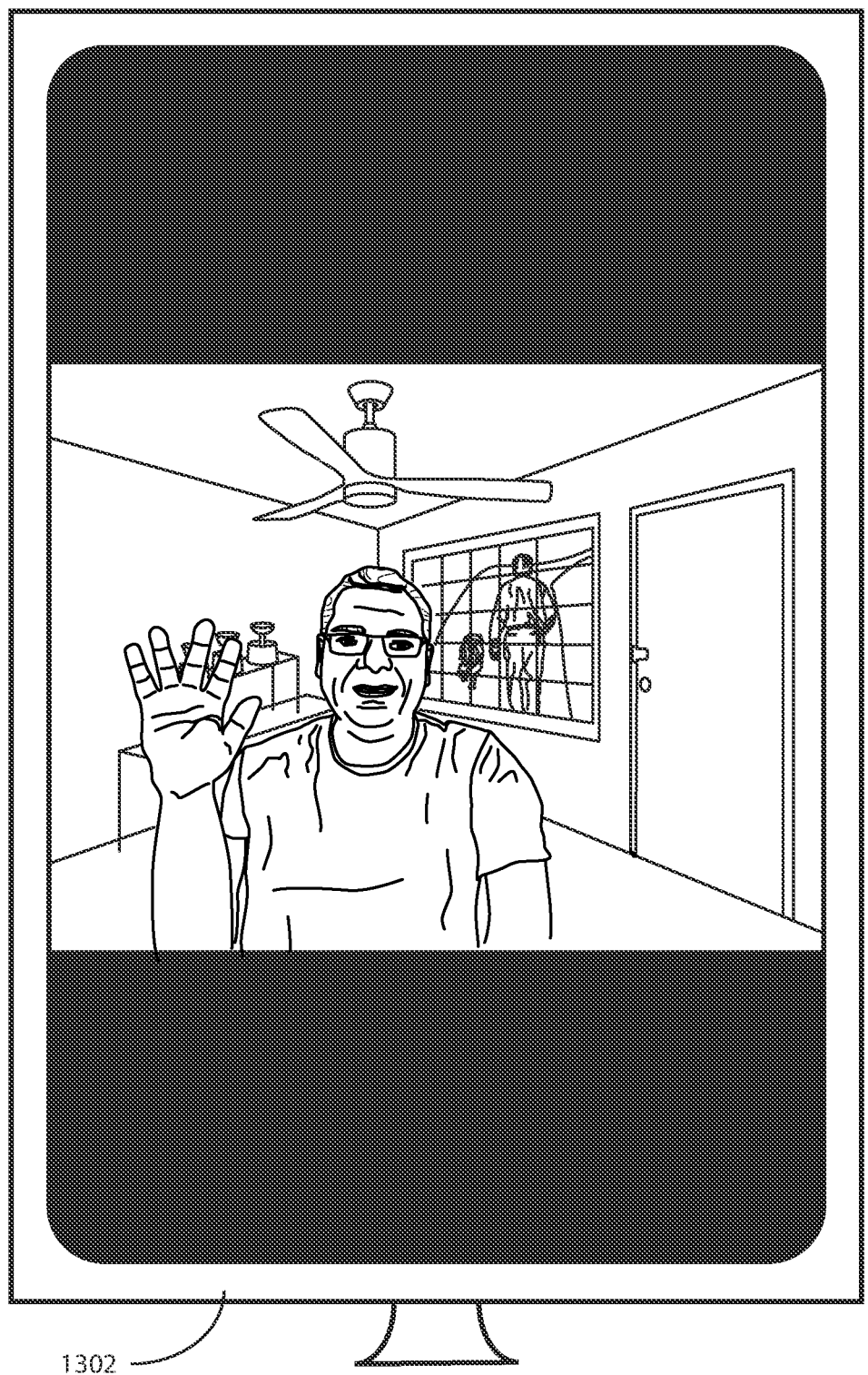
FIG. 14 illustrates one or more images delivered to a monitor from a prior art electronic device.

Turning briefly to FIG. 14, illustrated therein is what would occur if a prior art electronic device was operating as a webcam when the content presentation companion device 1302 was pivoted to the portrait orientation shown. The result will be all too familiar to anyone who has ever owned a "wide screen" television with a 16:9 aspect ratio when watching content recorded at a 4:3 aspect ratio.

As shown in FIG. 14, the one or more images captured by a prior art device int the landscape image orientation are presented on the content presentation companion device 1302 when the content presentation companion device 1302 is oriented in the portrait orientation, black bars appear at the top and bottom of the one or more images. Said differently, when the width of the landscape image orientation images is scaled to match the width of the portrait orientation of the content presentation companion device 1302, black bars appear to the top and bottom of the images due to the mismatch of orientation in three-dimensional space, as shown in the figure.

While some prior art systems can scale the image as a compensatory measure, none of them will cause the image to fill the screen without distortion. This is true because each compensatory measure is a scaling operation, and not an aspect ratio or image orientation changing operation.

Illustrating by example, television manufacturers typically offer the user alternate selections to the standard "fit" mode, each of which allow the user to choose between either a "zoom" mode, "overscan" mode, or a "stretch" mode. "Zoom" mode, which is also known as a "fill" mode or a "crop" mode, scales the content larger. With this option, the content is scaled until the height of the landscape image orientation content matches the height of the portrait orientation of the content presentation companion device 1302. This scaling operation keeps the content of the image in the proper perspective. However, this results in the left and right sides of the landscape image orientation images spilling beyond the visible area of the display of the content presentation companion device 1302.

With the "stretch" option, the perspective is completely destroyed, as the width of the landscape image orientation images is held constant while the height of the landscape image orientation images is stretched to match the height of the portrait orientation of the content presentation companion device 1302. This results in distortion of the image, causing things to become taller and thinner.

Advantageously, embodiments of the disclosure avoid these problems by modifying the one or more images to change one or more content output parameters prior to the communication device delivering the one or more images to the content presentation companion device for presentation in response to receiving one or more content input parameters requested by the content presentation companion device. As described above, the modifications can include changing an aspect ratio of the one or more images, transitioning an image orientation from a portrait image orientation to a landscape image orientation (or vice versa), applying a crop mask, identifying a region of interest, or by other techniques.

Figure 15:
FIG. 15 illustrates one or more altered images delivered to from an electronic device to a content presentation companion device in accordance with one or more embodiments of the disclosures.

Illustrating by example, turning now to FIG. 15, illustrated therein are the one or more images 1301 when delivered to the content presentation companion device 1302 from the electronic device (800) of FIG. 13. As shown, a region of interest depicting the person 1300 has been identified. A crop mask, oriented in the portrait image orientation, has been applied with the region of interest depicting the person 1300 centrally situated within the perimeter of the crop mask. Accordingly, in response to the content presentation companion device 1302 requesting the one or more images 1301 in the portrait image orientation, the one or more processors of the electronic device (800) have modified the one or more images 1301 to change the one or more content output parameters prior to the communication device delivering the one or more images 1301 to the content presentation companion device 1302 for presentation. Accordingly, the modified images fit the portrait orientation of the content presentation companion device 1302 perfectly, with the person 1300 situated in the center of the display.

Figure 16:
FIG. 16 illustrates one or more other altered images delivered to from an electronic device to a content presentation companion device in accordance with one or more embodiments of the disclosures.

FIG. 16 illustrates another example of how the modifications to the one or more images 1301 can be made. The content presentation companion device 1601 of FIG. 6 is square in shape, which means it has a different orientation input parameter and a different aspect ratio input parameter. As shown in FIG. 16, one or more processors of the electronic device (800) capturing the one or more images 1301 have identified a region of interest depicting the person 1300, with an orientation 1602 of the person's head defining which side of the region of interest is the top. Thereafter, the one or more processors have changed the aspect ratio of the one or more images 1301 and have applied a crop mask about the region of interest so that the person's head is centrally situated within the one or more images 1301 after modification.

Figure 17:
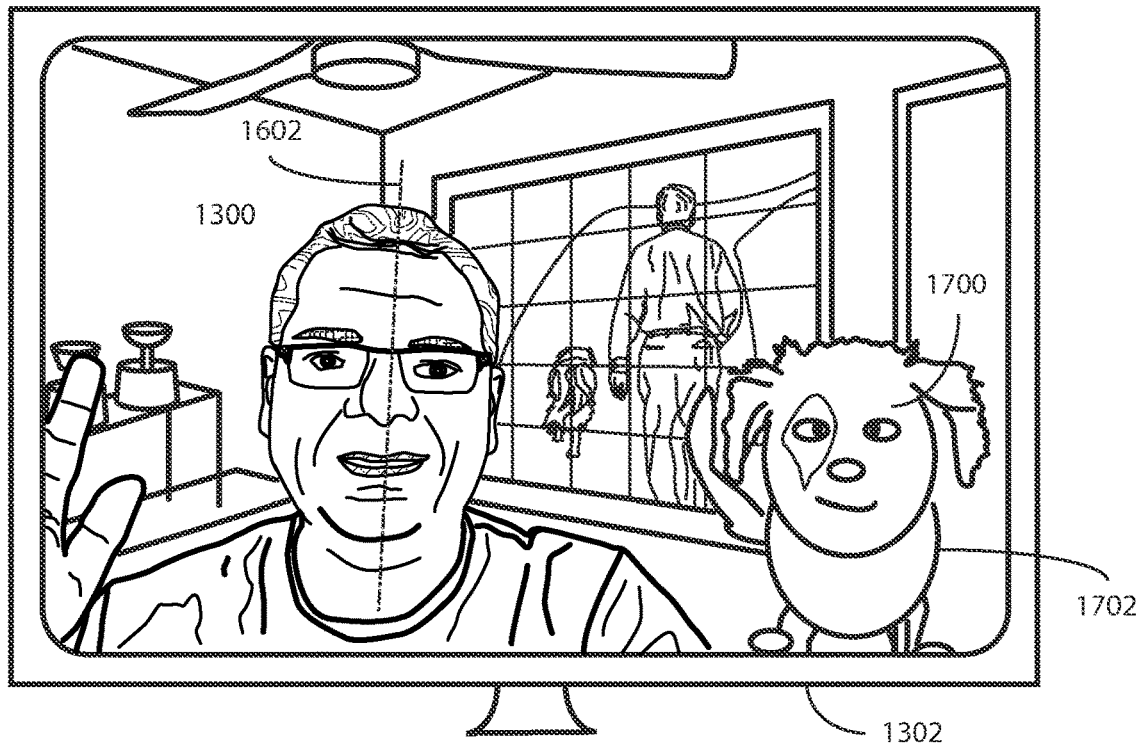
FIG. 17 illustrates still other altered images delivered to from an electronic device to a content presentation companion device in accordance with one or more embodiments of the disclosures.

While the orientation 1602 of the person's head can be used to determine the region of interest, as described above embodiments of the disclosure contemplate that the one or more images 1301 can not only include persons, but also animals or non-living objects as well. Turning now to FIG. 17, as shown the person's dog 1700 has made an impromptu appearance in the videoconference. Accordingly, the one or more processors of the electronic device (800) use artificial intelligence to detect this. They then adjust the subset of the one or more images 1301 defining the region of interest based both upon the orientation 1602 of the user's head and the body shape 1702 of the person's dog 1700. In this illustration, the distance between these subjects and the first image capture device (806) of the electronic device (800) is employed as well, as only the person 1300 and the dog 1700 are used to identify the region of interest due to the fact that they are within a predefined distance of the first image capture device (806). The other person and other dog walking outside of the window are therefore excluded from the region of interest determination since they are beyond the predefined distance from the first image capture device (806).

Advantageously, embodiments of the disclosure allow perfect images to be delivered to a content presentation companion device in accordance with one or more content input parameters requested by that content presentation companion device regardless of orientation or geometric shape of the electronic device delivering those images. Embodiments of the disclosure advantageously allow electronic devices having a variety of different geometric form factors and/or positions in three-dimensional space to provide perfectly compensated images to a content presentation companion device when the electronic device is being used as a webcam or other type of camera.

Figure 18:
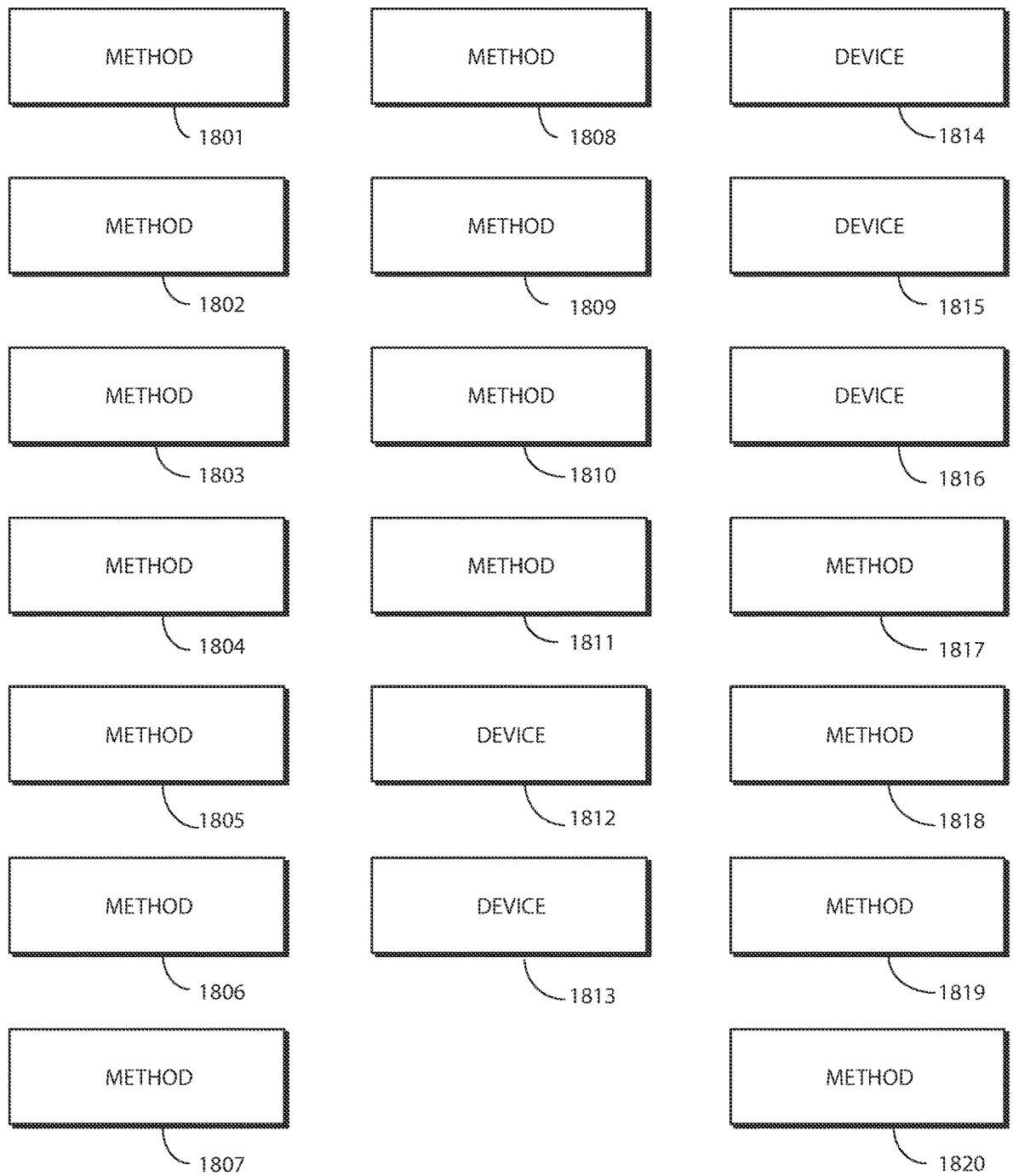
FIG. 18 illustrates one or more embodiments of the disclosure.

Turning now to FIG. 18, illustrated therein are various embodiments of the disclosure. The embodiments of FIG. 18 are shown as labeled boxes in FIG. 18 due to the fact that the individual components of these embodiments have been illustrated in detail in FIGS. 1-17, which precede FIG. 18. Accordingly, since these items have previously been illustrated and described, their repeated illustration is no longer essential for a proper understanding of these embodiments. Thus, the embodiments are shown as labeled boxes.

At 1801, a method in an electronic device comprises detecting, with one or more processors, a communication device of the electronic device electronically in communication with another electronic device while an image capture device of the electronic device captures one or more images from an environment of the electronic device.

At 1801, the method comprises determining, by the one or more processors from signals received from the content presentation companion device by the communication device, one or more content input parameters requested by the content presentation companion device that differ from at least one content output parameter of the image capture device.

At 1801, the method comprises altering, by the one or more processors, the one or more images to create one or more altered images meeting the one or more content input parameters required for the presentation on the content presentation companion device.

At 1802, the content input parameters of 1801 required for the presentation on the content presentation companion device that differ from the at least one content output parameter of the image capture device comprise an aspect ratio of the one or more images. At 1803, the content input parameters of 1801 required for the presentation on the content presentation companion device that differ from the at least one content output parameter of the image capture device comprise a content presentation orientation of the content presentation companion device.

At 1804, the content presentation orientation of the content presentation companion device of 1803 is selected from the group consisting of a portrait image orientation and a landscape image orientation. At 1805, the altering of 1803 comprises cropping the one or more images with a crop mask matching the content presentation orientation of the content presentation companion device to create one or more cropped images.

At 1806, the method of 1805 further comprises determining a region of interest within the one or more images. At 1806, the crop mask is positioned such that region of interest is situated within the one or more cropped images. At 1807, the region of interest of 1806 depicts a subject of the one or more cropped images.

At 1808, the one or more cropped images of 1807 comprise a plurality of cropped images. At 1801, the method further comprises detecting, by the one or more processors, movement of the subject of within at least some cropped images of the plurality of cropped images and moving the crop mask to maintain depictions of the subject substantially centered within the plurality of cropped images.

At 1809, the method of 1801 further comprises determining, by the one or more processors using one or more sensors, whether the electronic device is moving. At 1809, the altering the one or more images to create the one or more altered images meeting the one or more content input parameters required for the presentation at the content presentation companion device occurs only when the electronic device is substantially stationary.

At 1810, the method of 1801 further comprises identifying the at least one content output parameter of the image capture device by detecting, with the one or more processors using one or more sensors of the electronic device, one or both of a geometric form factor of the electronic device and/or an orientation of the electronic device in three-dimensional space.

At 1811, the method of 1801 further comprises detecting the electronic device being coupled to a docking station while capturing the one or more images during a videoconference. At 1811, the altering the one or more images to create the one or more altered images meeting the one or more content input parameters required for the presentation at the content presentation companion device occurs only when the electronic device is coupled to the docking station and engaged in the videoconference.

At 1812, an electronic device comprises an image capture device capturing one or more images. At 1812, the electronic device comprises a communication device electronically in communication with a content presentation companion device operating as a primary display for the electronic device.

At 1812, the electronic device comprises one or more sensors detecting one or both of a geometric form factor of the electronic device and/or an orientation of the electronic device in three-dimensional space to identify one or more content output parameters of the image capture device. At 1812, the electronic device comprises one or more processors modifying the one or more images to change the one or more content output parameters prior to the communication device delivering the one or more images to the content presentation companion device for presentation.

At 1813, the one or more processors of 1812 modify the one or more images by changing an aspect ratio of the one or more images. At 1814, the one or more processors of 1812 modify the one or more images by transitioning an image orientation from a portrait orientation to a landscape orientation.

At 1815, the electronic device of 1812 operates as a primary video input conveying images of a participant of a videoconference during the videoconference. At 1816, the one or more processors of 1812 modify the one or more images in response to signals received from the content presentation companion device through the communication device requesting at least one content input parameter to be different from the one or more content output parameters.

At 1817, a method in an electronic device comprises detecting, with one or more sensors, whether the electronic device is in a stationary condition or a docket condition. At 1817, the method comprises detecting, with a communication device, a content presentation companion device in communication with the communication device being used as a primary display for the electronic device. At 1817, the content presentation companion device has associated therewith content input parameters required for presentation of content on the content presentation companion device.

At 1817, the method comprises capturing, with an image capture device, one or more images for presentation on the content presentation companion device. At 1817, the one or more images have associated therewith content output parameters defined by a physical state of the image capture device.

At 1817, the method comprises modifying, with one or more processors, the one or more images to change any of the content output parameters that differ from any of the content input parameters to create one or more modified images. At 1817, the method comprises delivering, with the communication device, the one or more modified images to the content presentation companion device for presentation on the content presentation companion device. At 1818, the one or more images of 1817 comprise one or more videoconference images.

At 1819, the method of 1818 further comprises identifying, with the one or more processors, a region of interest of the one or more images. At 1819, the modifying comprises selecting a subset of the one or more images containing the region of interest. At 1820, the subset of 1819 changes as the region of interest moves within the one or more images.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more processors, a communication device of the electronic device electronically in communication with another electronic device while an image capture device of the electronic device captures one or more images from an environment of the electronic device;
    determining, by the one or more processors from signals received from the another electronic device by the communication device, one or more content input parameters requested by the another electronic device that differ from at least one content output parameter of the image capture device; and
    altering, by the one or more processors, the one or more images to create one or more altered images meeting the one or more content input parameters required for the presentation on the another electronic device;
    wherein the one or more images and the one or more altered images include at least one difference other than rotation.

2. The method of claim 1, wherein the content input parameters required for the presentation on the another electronic device that differ from the at least one content output parameter of the image capture device comprise an aspect ratio of the one or more images.

3. The method of claim 1, wherein the content input parameters required for the presentation on the another electronic device that differ from the at least one content output parameter of the image capture device comprise a content presentation orientation of the another electronic device.

4. The method of claim 3, wherein the content presentation orientation of the another electronic device is selected from the group consisting of a portrait image orientation and a landscape image orientation.

5. The method of claim 3, wherein the altering comprises cropping the one or more images with a crop mask matching the content presentation orientation of the another electronic device to create one or more cropped images.

6. The method of claim 5, further comprising determining a region of interest within the one or more images, wherein the crop mask is positioned such that region of interest is situated within the one or more cropped images.

7. The method of claim 6, wherein the region of interest depicts a subject of the one or more cropped images.

8. The method of claim 7, wherein the one or more cropped images comprise a plurality of cropped images, further comprising detecting, by the one or more processors, movement of the subject of within at least some cropped images of the plurality of cropped images and moving the crop mask to maintain depictions of the subject substantially centered within the plurality of cropped images.

9. The method of claim 1, further comprising determining, by the one or more processors using one or more sensors, whether the electronic device is moving, wherein the altering the one or more images to create the one or more altered images meeting the one or more content input parameters required for the presentation at the another electronic device occurs only when the electronic device is substantially stationary.

10. The method of claim 1, further comprising identifying the at least one content output parameter of the image capture device by detecting, with the one or more processors using one or more sensors of the electronic device, one or both of a geometric form factor of the electronic device and/or an orientation of the electronic device in three-dimensional space.

11. The method of claim 1, further comprising detecting the electronic device being coupled to a docking station while capturing the one or more images during a videoconference, wherein the altering the one or more images to create the one or more altered images meeting the one or more content input parameters required for the presentation at the another electronic device occurs only when the electronic device is coupled to the docking station and engaged in the videoconference.

12. An electronic device, comprising:
an image capture device capturing one or more images;
a communication device electronically in communication with a content presentation companion device operating as a primary display for the electronic device;
one or more sensors detecting one or both of a geometric form factor of the electronic device and/or an orientation of the electronic device in three-dimensional space to identify one or more content output parameters of the image capture device; and
one or more processors modifying the one or more images to change the one or more content output parameters prior to the communication device delivering the one or more images to the content presentation companion device for presentation.

13. The electronic device of claim 12, the one or more processors modifying the one or more images by changing an aspect ratio of the one or more images.

14. The electronic device of claim 12, the one or more processors modifying the one or more images by transitioning an image orientation from a portrait orientation to a landscape orientation.

15. The electronic device of claim 12, wherein the electronic device operates as a primary video input conveying images of a participant of a videoconference during the videoconference.

16. The electronic device of claim 12, the one or more processors modifying the one or more images in response to signals received from the content presentation companion device through the communication device requesting at least one content input parameter to be different from the one or more content output parameters.

17. A method in an electronic device, comprising:
detecting, with one or more sensors, whether the electronic device is in a stationary condition or a docket condition;
detecting, with a communication device, a content presentation companion device in communication with the communication device being used as a primary display for the electronic device, the content presentation companion device having associated therewith content input parameters required for presentation of content on the content presentation companion device;
capturing, with an image capture device, one or more images for presentation on the content presentation companion device, the one or more images having associated therewith content output parameters defined by a physical state of the image capture device;
modifying, with one or more processors, the one or more images to change any of the content output parameters that differ from any of the content input parameters to create one or more modified images; and
delivering, with the communication device, the one or more modified images to the content presentation companion device for presentation on the content presentation companion device.

18. The method of claim 17, wherein the one or more images comprise one or more videoconference images.

19. The method of claim 18, further comprising identifying, with the one or more processors, a region of interest of the one or more images, wherein the modifying comprises selecting a subset of the one or more images containing the region of interest.

20. The method of claim 19, further wherein the subset changes as the region of interest moves within the one or more images.

* * * * *